US005218528A

United States Patent [19]

Wise et al.

[11] Patent Number: 5,218,528

[45] Date of Patent: Jun. 8, 1993

[54] AUTOMATED VOTING SYSTEM

[75] Inventors: George E. Wise; Parimal A. Patel; Clement L. Howe; William P. Spiers, all of San Antonio, Tex.

[73] Assignee: Advanced Technological Systems, Inc., San Antonio, Tex.

[21] Appl. No.: 609,988

[22] Filed: Nov. 6, 1990

[51] Int. Cl.[5] ........................ G06F 15/20; G06G 7/48

[52] U.S. Cl. .................................. 364/409; 235/54 F; 235/50 R; 235/56; 235/51

[58] Field of Search ........................ 364/409; 434/306; 235/54 F, 51, 50 R, 56, 55 C, 55 R, 38 G

[56] References Cited

U.S. PATENT DOCUMENTS 3,636,318 1/1972 Lindstrom et al. ......... 235/61.12 M
3,919,544 11/1975 O'Neal et al. .................... 235/55 R
3,947,669 3/1976 Simmons et al. .................. 235/156
3,980,864 9/1976 Smith, Jr. ......................... 235/55 R
4,010,353 3/1977 Moldovan, Jr. et al. ......... 235/54 F
4,015,106 3/1977 De Phillipo ....................... 235/54 F
4,016,404 4/1977 Appleton ........................ 235/61.7 B
4,021,780 5/1977 Narey et al. ...................... 235/54 F
4,025,757 5/1977 McKay ............................. 235/54 F
4,578,572 3/1986 Hice ............................... 235/472
4,641,240 2/1987 Boram .............................. 364/409
4,641,241 2/1987 Boram .............................. 364/409
4,677,435 6/1987 D'Agraives ..................... 340/825.31
4,764,120 8/1988 Griffin et al. ..................... 434/336
4,774,665 9/1988 Webb ............................... 364/409

*Primary Examiner*—Roy N. Envall, Jr.
*Assistant Examiner*—Laura Brutman
*Attorney, Agent, or Firm*—Baker & Botts

[57] ABSTRACT

An automated voting system that integrates the stages of registering and certifying voters and collecting their votes. A computer-based voter registration station accesses a database to verify that the voter is eligible to vote. Vote entry stations provide a computer-based interactive graphic interface for permitting the voter to enter votes. A vote entry controller activates and monitors the vote entry stations to prevent unauthorized voting. Votes may be collected at either the vote entry stations or at the vote entry controller to which they are downloaded, which enhances security by providing a means to compare votes collected at one point in the system with votes collected at another point.

24 Claims, 29 Drawing Sheets

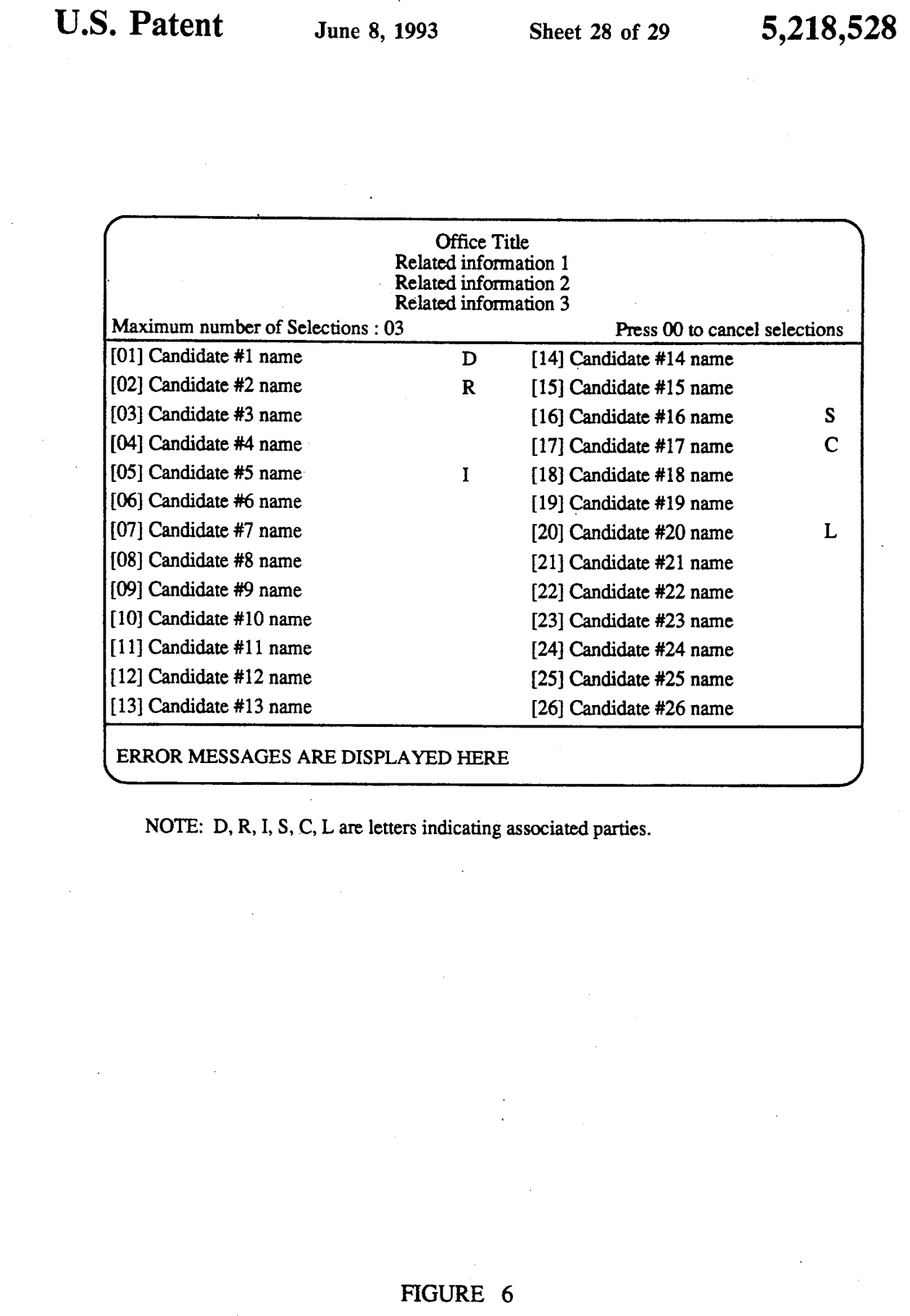

Office Title
Related information 1
Related information 2
Related information 3

Maximum number of Selections : 03 Press 00 to cancel selections

| | | | |
|---|---|---|---|
| [01] Candidate #1 name | D | [14] Candidate #14 name | |
| [02] Candidate #2 name | R | [15] Candidate #15 name | |
| [03] Candidate #3 name | | [16] Candidate #16 name | S |
| [04] Candidate #4 name | | [17] Candidate #17 name | C |
| [05] Candidate #5 name | I | [18] Candidate #18 name | |
| [06] Candidate #6 name | | [19] Candidate #19 name | |
| [07] Candidate #7 name | | [20] Candidate #20 name | L |
| [08] Candidate #8 name | | [21] Candidate #21 name | |
| [09] Candidate #9 name | | [22] Candidate #22 name | |
| [10] Candidate #10 name | | [23] Candidate #23 name | |
| [11] Candidate #11 name | | [24] Candidate #24 name | |
| [12] Candidate #12 name | | [25] Candidate #25 name | |
| [13] Candidate #13 name | | [26] Candidate #26 name | |

ERROR MESSAGES ARE DISPLAYED HERE

NOTE: D, R, I, S, C, L are letters indicating associated parties.

FIGURE 6

AUTOMATED VOTING SYSTEM

TECHNICAL FIELD OF THE INVENTION

This invention relates to automated voting systems, and more particularly to a computer controlled voting system for registering and controlling access of voters to voting booths and for collecting votes in a secure manner.

BACKGROUND OF THE INVENTION

Two important criteria of any voting system are voter privacy and ballot security Voter privacy is ensured when the voter's name is not attached to his or her ballot. Ballot security is accomplished different ways, with a traditional method for providing security at the voting site being limiting access to ballots by persons handling them.

A traditional method for controlling access of voters to voting booths is to intercept voters as they enter the voting place. At that time, voting personnel verify that each voter's name is on a master list of registered voters in the voting district and that they have not already voted in that election. This verification and certification process is slow and potentially inaccurate. It does have the advantage of maintaining the privacy of the voting booth because voters, names are not associated with the voting process once they are allowed access to the booths.

A traditional method for casting ballots in the voting booth is to switch mechanical levers next to the voters' desired selections presented on a printed ballot form. Alternatively, the voters punch holes or pencil-in spots on a computer card, each hole or spot representing a selection on the ballot, and the cards are then machine read. These methods are slow and potentially inaccurate and, in the case of punched holes, provide no way for voters to change their minds. Additionally, the preprinted forms become unwieldy if the ballots must be presented in additional languages, such as Spanish or French.

A number of different types of automated voting systems have been used, which use computers to aid in gathering and counting votes. These systems include systems such as that described in U.S. Pat. No. 4,774,665, which describes a system having a number of precinct workstations for reading, counting, and storing votes, and a central district workstation for controlling the programming of the precinct stations and for reading and tallying stored precinct votes.

However, existing automated voting systems do not provide an integrated system. For example, where automated vote entry devices are used, there is no means for controlling access to them. Nor do existing systems solve the problems associated with unauthorized access to the system. Although most systems attempt to limit access by unauthorized persons, they do not provide a means for detecting a security breach. A need exists for an improved automated voting system.

SUMMARY OF THE INVENTION

The invention overcomes the problems associated with the traditional methods while maintaining their advantages. It includes a voter registration station, which allows voting personnel to verify a voter's registration and that the voter has not already voted in that election. The invention also provides a vote entry controller and vote entry stations, which are physically and electrically isolated from the voter registration station.

The vote entry station is a computer-based interactive system, and replaces a traditional voting booth. It provides a graphic display of the ballot, and may be configured for various offices and propositions, for voting in different languages, for straight party voting, and for write-in votes. After the voter enters selections, the vote entry station offers the voter an opportunity to review the completed ballot and make any desired changes. The voting booth also provides a means to cast write-in ballots.

Advantages of the system are that it provides an integrated approach to automated voting. The system improves traditional voting methods by maintaining voter privacy and enhancing vote security. The vote entry controller and the vote entry stations provide multiple levels of security to prevent tampering with the voting process and to facilitate recounts if necessary. To provide additional security, the vote entry stations are operable only when activated by a code from the vote entry controller and become inoperable after the voter makes final selections. Optional data communication links connect the registration station and the vote entry controller to remote centralized voter information storage and vote collection storage, respectively. Voter information storage is isolated from vote collection storage to ensure privacy.

BRIEF DESCRIPTION OF THE DRAWINGS

FIG. 6 illustrates a sample office voting ballot displayed by vote entry station.

DETAILED DESCRIPTION OF THE INVENTION

System Overview

Figure 1:
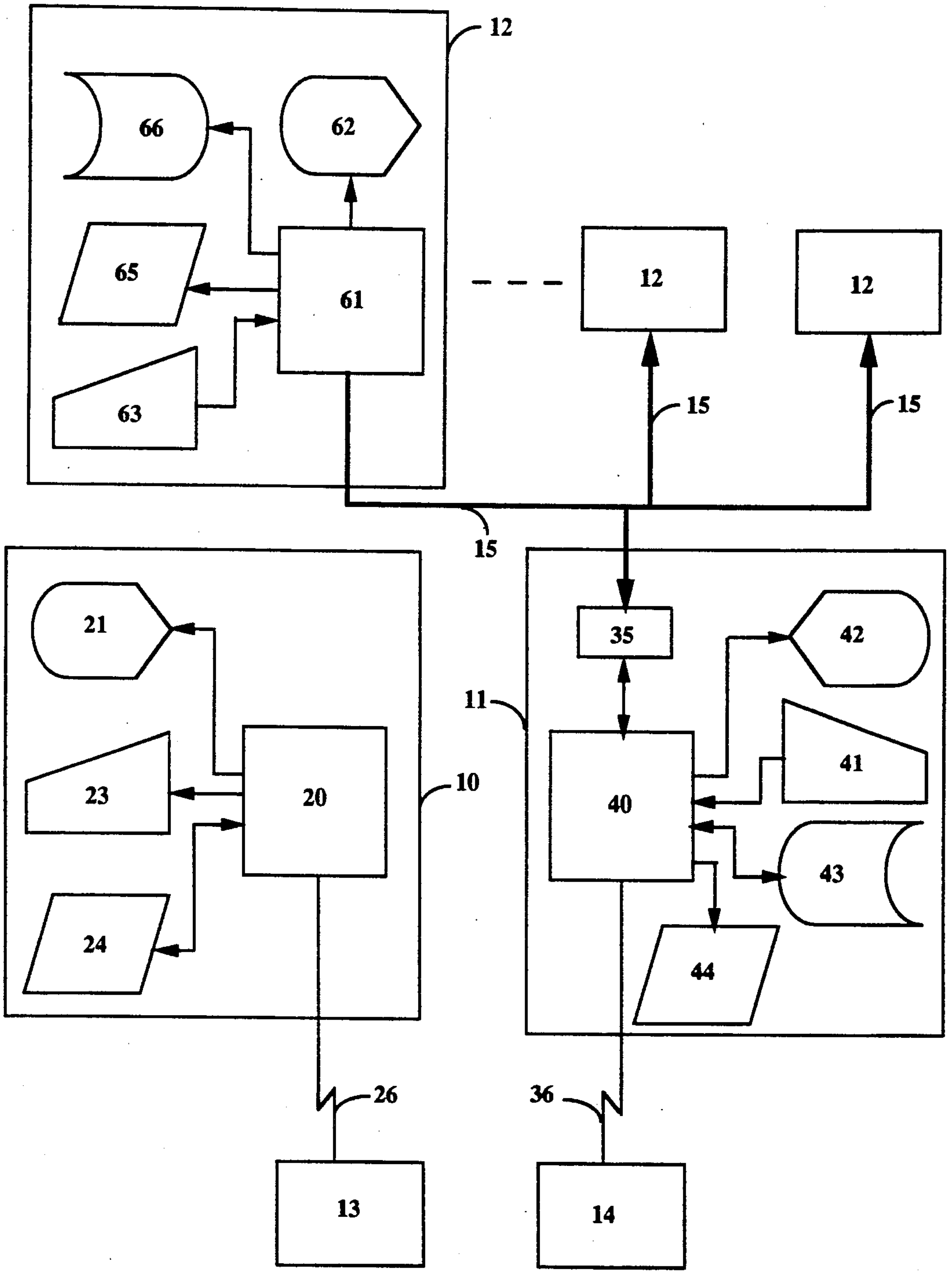
FIG. 1 is a block diagram of the hardware components of the voting system.

FIG. 1 is a block diagram of the hardware components of the invention, herein referred to as the voting system. As voters enter the voting place, they are directed to a voter registration station 10, which is computer-based and is programmed to be used by an operator to determine whether the voters are registered, whether they have reported to the correct voting place, and whether they have already voted in that election. Voter registration station 10 is explained below in connection with FIGS. 2A–2H.

After being verified to be eligible at voter registration station 10, a voter proceeds to vote entry controller 11, which is in data and control signal communication with a number of vote entry stations 12. Vote entry controller 11 is also computer-based and is programmed to be used by an operator to monitor the status of the vote entry stations 12 and allocate their use, as explained below in connection with FIGS. 3A–3G.

To permit a voter to vote, vote entry controller 11 sends an activation signal to an idle vote entry station 12, via communication links 15, which causes that vote entry station 12 to become enabled. Then, the voter enters the enabled vote entry station 12, which is also computer-based and is programmed with a graphic voter interface program, which permits the voter to interactively enter votes. Vote entry stations 12 are explained below in connection with FIGS. 4 and 5A–5I.

After the voter has voted, the votes are downloaded to vote entry controller 11, via communication links 15, where they are stored for subsequent tabulation. Additionally, the votes are stored at each vote entry station 12 for subsequent compilation and comparison with the downloaded votes, for auditing purposes.

Registration station 10 and vote entry controller 11 may be easily implemented with a micro-computer, such as are commercially available, and may be programmed with any one of a number of programming languages used with those machines. However, the programming functions could also be permanently stored, and the computer-based devices implemented with dedicated, special purpose equipment, consistent with the functionality described herein. Vote entry stations 12 use a specially designed keyboard 63, which is explained below in connection with FIG. 4, and may also be easily implemented with standard micro-computer equipment or with dedicated computer equipment. Ideally, all components of the voting system are portable, so that the voting site may be assembled and dismantled as needed.

Voter registration station 10 is in data communication with a voter information database 13 via communication means 26. Vote entry controller is in data communication with a vote collection database 14 via communications means 36. Each of these databases 13 and 14 may be local, or may be remote. Typically, an election will have several voting locations, each having the voting system of FIG. 1, which are in communication with remote and central databases 13 and 14. However, regardless of whether they are local or remote, databases 13 and 14 are isolated, which ensures voter privacy. Communications means 26 and 36 include appropriate data communications interfaces, as well as communications links.

Registration Control Station

As shown in FIG. 1, voter registration station 10 comprises a computer 20, coupled to a keyboard 23 and bar code input device 24, such as a bar code reader and wand. A display 21 displays the computer's responses to an operator's inputs via the bar code reader 24 or keyboard 23. Computer 20 may be coupled to a database, such as database 13, via a telephone line 26 or other data communications link. Ideally, the communications link is dedicated and secure. Computer 20 may be a standard desktop or workstation computer.

FIGS. 2A–2H illustrate the registration control process, as implemented with programming of computer 20.

Figure 2A:
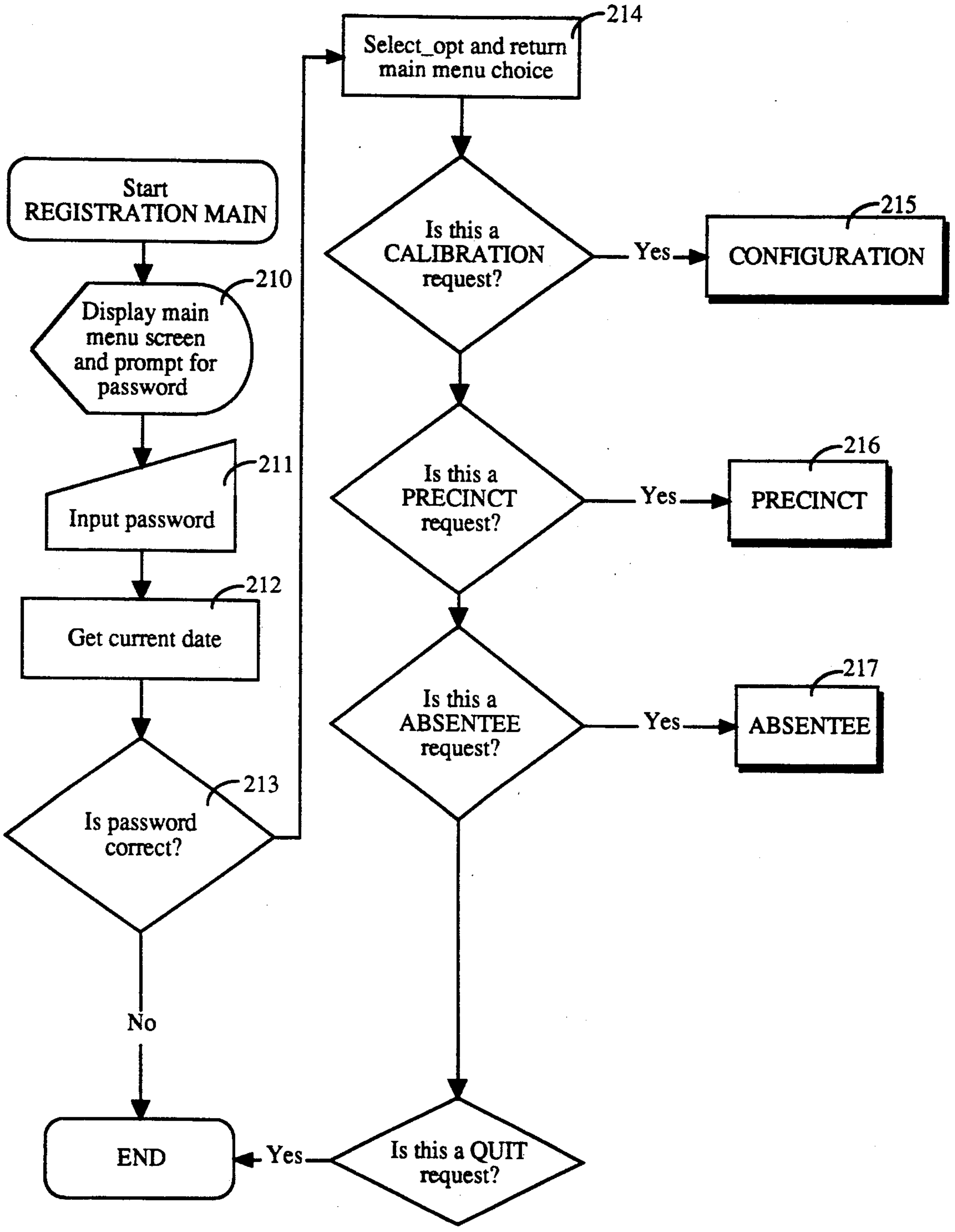
FIG. 2A is a flow chart of the Registration Main process performed by the registration control station.

FIG. 2A illustrates the Registration Main process, which is the main logic flow of the registration control process. Steps 210–213 perform a bootup and initialization process, which includes a password match for security purposes. Step 214 displays a main menu, which permits an operator to select from three options: Configuration, Precinct Voting, and Absentee Voting. After the selection is decoded, steps 215–217 are calling processes associated with each option. These processes are discussed below in connection with FIGS. 2B–2H.

Figure 2B:
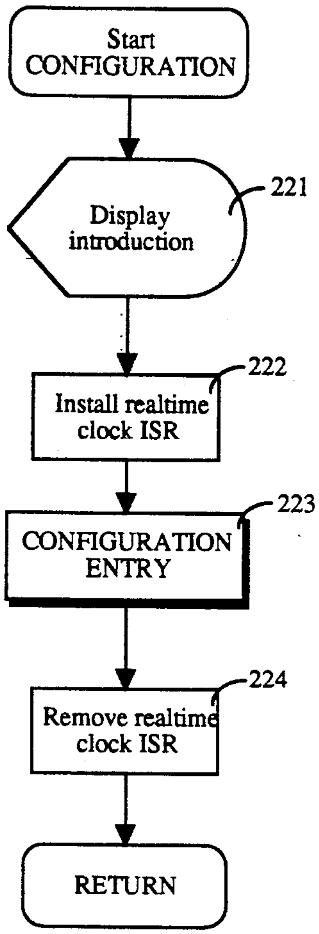
FIG. 2B is a flow chart of the Configuration process called by Registration Main.
Figure 2C:
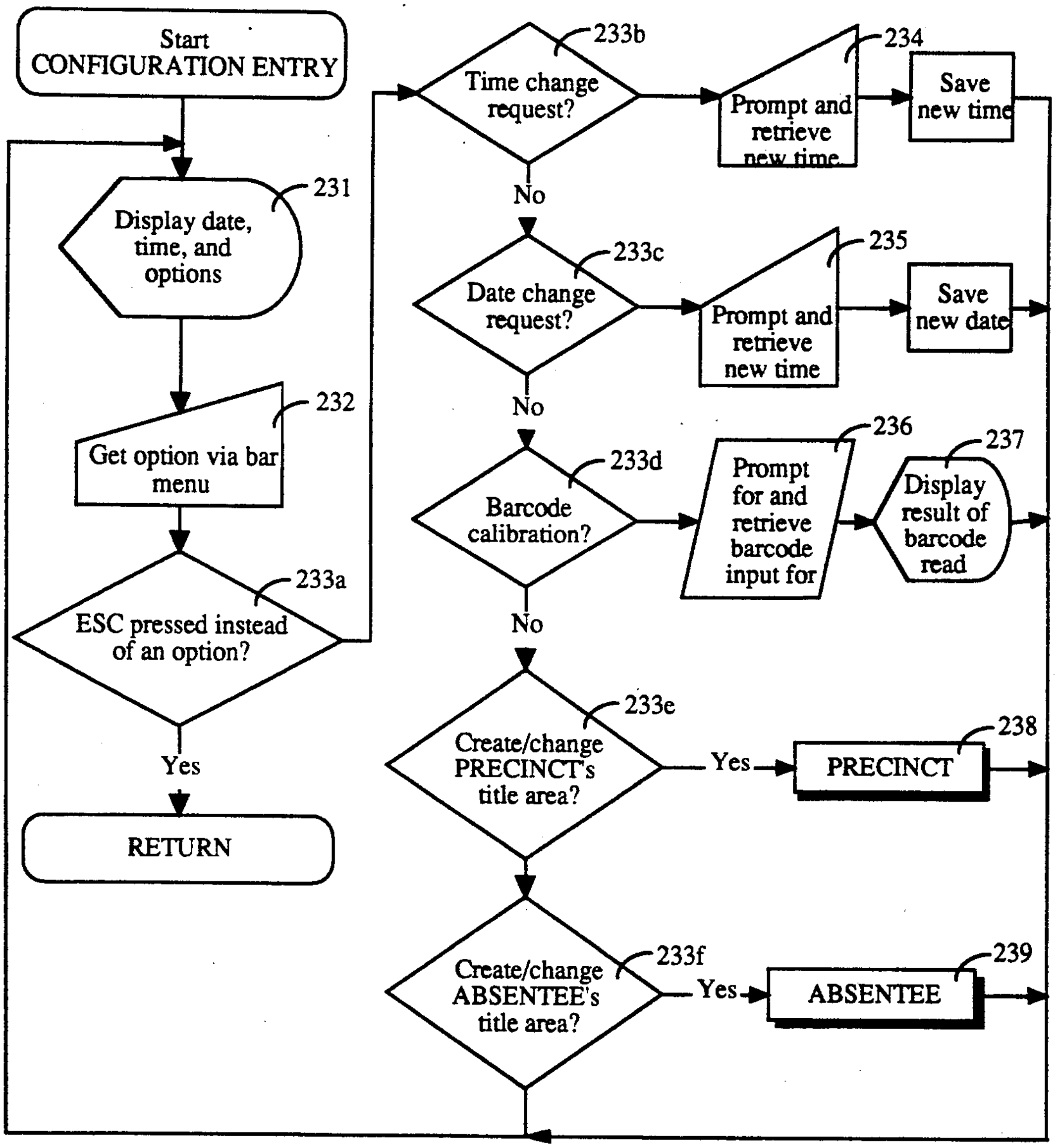
FIG. 2C is a flow chart of the Configuration Entry process called by Configuration.

FIGS. 2B and 2C illustrate the configuration process. In general, this process calibrates bar code reader 24, receives a current date and time, and configures the system for data pertaining to when and where the voting is occurring. More specifically, FIG. 2B illustrates a Configuration process, in which steps 221–223 display a menu, call a clock interrupt service routine, and call a data entry process. FIG. 2C illustrates the Configuration Entry process. Step 231 displays the time, date, and various menu options. Step 232 is receiving a selection from the operator, and steps 233a–233f are decoding the selection. If the selection is for a change of date or time, steps 234 and 235 receive a new date or time from the operator. If the selected option is to calibrate the bar code reader 24, step 236 prompts the operator to pass bar code reader 24 over a known bar code. This code is detected and, in step 237, the results of the read are displayed. Step 238 calls a process that permits the operator to configure the system with voting site data, by entering information such as the precinct number, type of election, and precinct address. Step 239 is used when the voting system is being used for absentee voting, and permits the operator to enter similar information.

Figure 2D:
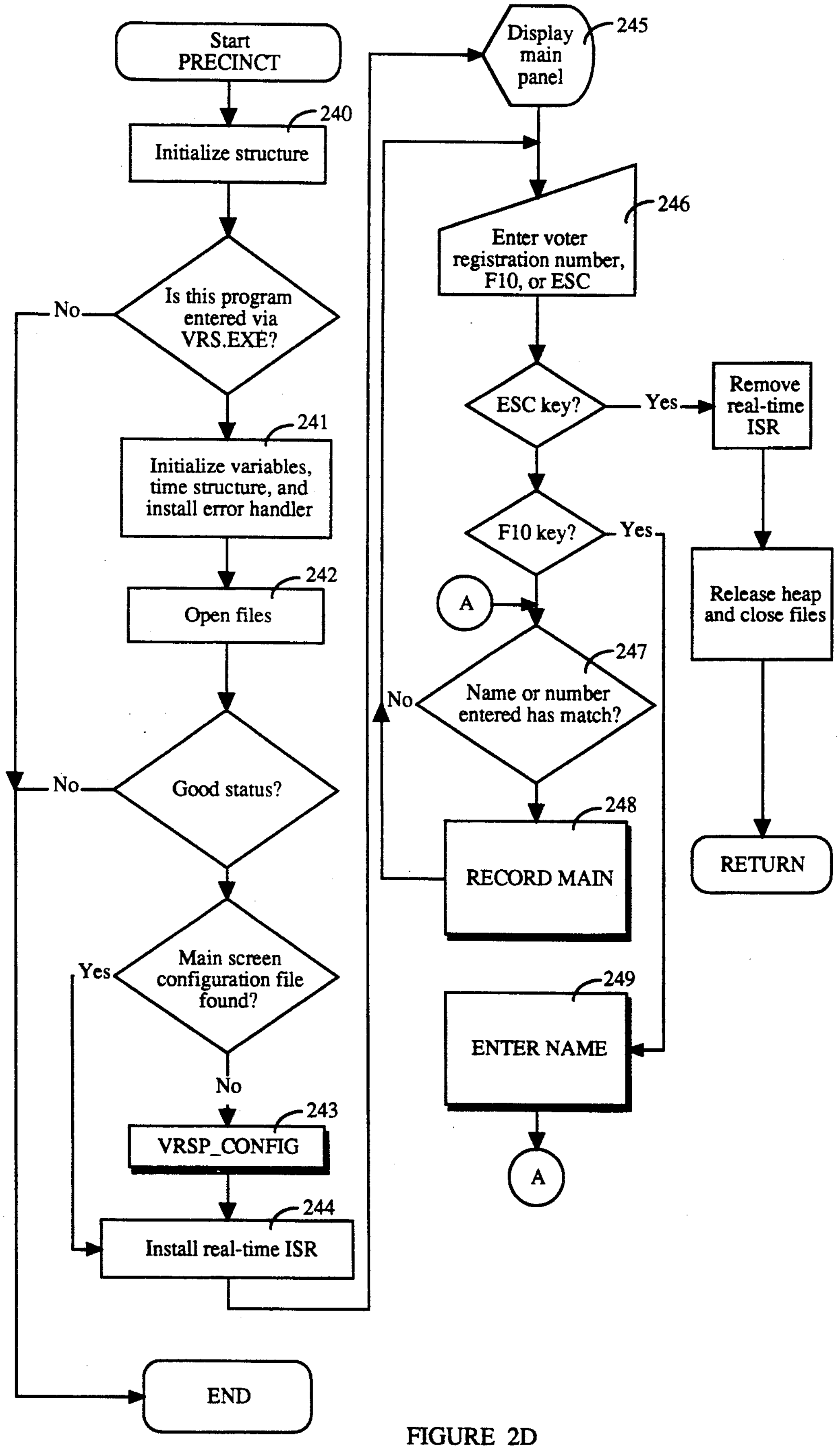
FIG. 2D is a flow chart of the Precinct process called by Registration Main.

FIG. 2D illustrates the Precinct process, which is the second option of the voter registration process of FIG. 2A. The Precinct process is used on voting days to verify voter registration cards. In the preferred embodiment, these cards are coded with a voter registration number in bar code format, to be read by bar code reader 24. However, the invention may also be implemented without bar codes, in which case voter registration information would be visually read by the operator and input into computer 20 via keyboard 23.

Steps 240–245 of the Precinct process of FIG. 2D are initialization steps. Then, step 246 is accepting a voter number, via bar code reader 24. Alternatively, the voter number may be manually entered. In step 247, the voter's number is compared to database 13, which stores valid voter registration numbers, to determine whether the voter's registration number is valid. As discussed above, database 13 may be local to voter registration station 10 or may be remote. Ideally, database 13 stores a complete record for each voter that includes address and other demographic data. If the number read is valid, step 248 calls a Record Main process, which is explained in connection with FIG. 2E.

Figure 2E:
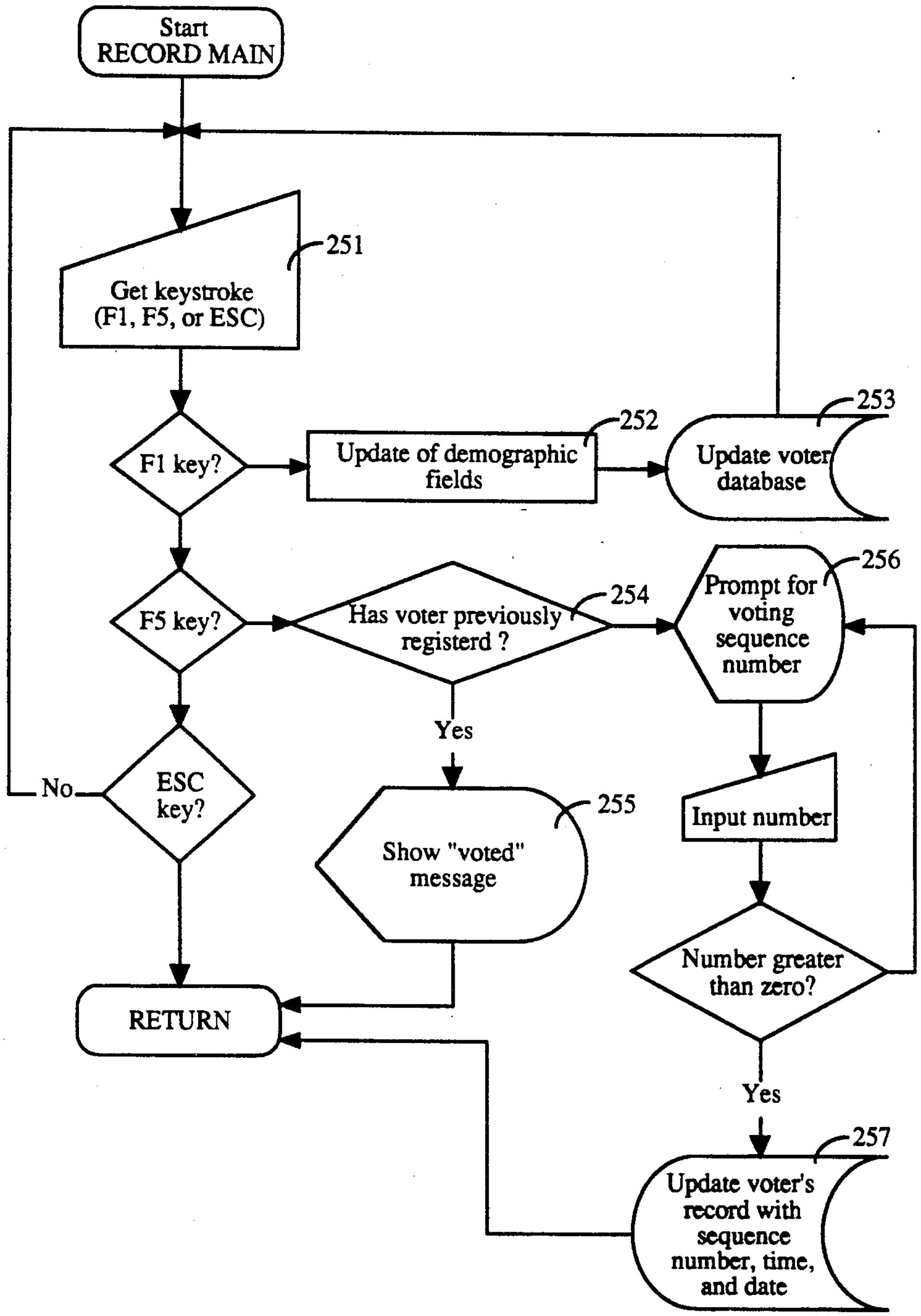
FIG. 2E is a flow chart of the Record Main process called by Precinct.

Referring to FIG. 2E, the Record Main process matches the voter registration number to the voter's record and displays information about the voter on display 21. Step 251 is accepting various commands from the operator that permit the operator to update the voter's demographic data, as shown by steps 252 and 253, or to determine whether the voter has previously registered and so inform the operator, as shown by steps 254 and 255. If the voter has not already voted, steps 256 and 257 are assigning the voter a sequence number and updating the voter's record to show that the voter has been certified for that election. This updating is accomplished with a code that can be removed only by means of a special program to reset all voters' records before a new election. Record Main then returns to the Precinct process of FIG. 2D.

Referring again to FIG. 2D, step 249 is used if the voter does not have his or her voter registration card or know his or her number. In that situation, step 249 calls an Enter Name process, which is illustrated in FIG. 2F.

Figure 2F:
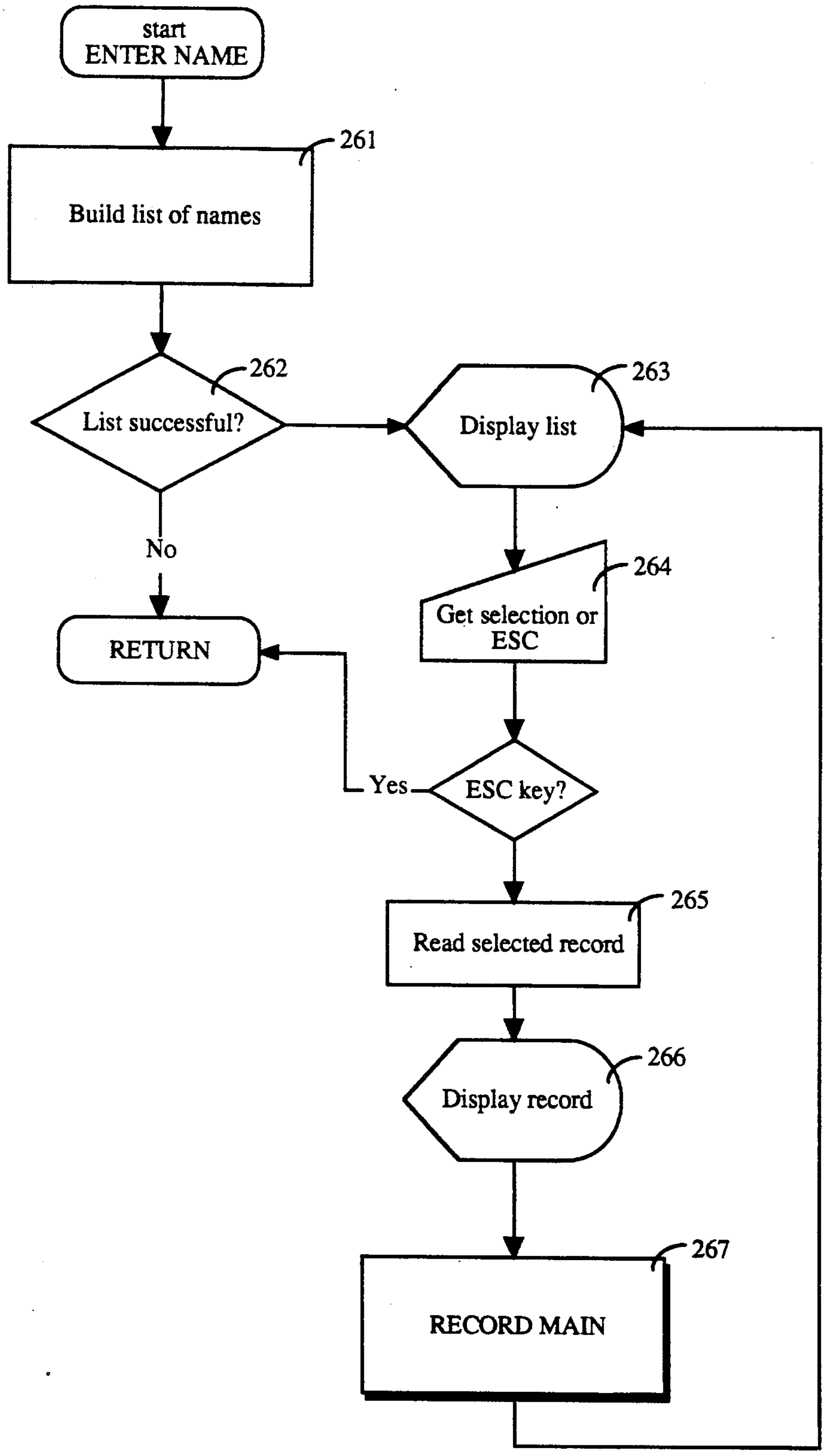
FIG. 2F is a flow chart of the Enter Name process called by Precinct.

Referring now to FIG. 2F, the Enter Name process permits the operator to enter other information about the voter, such as a name, which is used to find a match in the database 13. Steps 261–264 match an entered name with names in database 13, and display the results. The process includes building a list of all names found in database 13 that match the voter,s name or partial name, as entered into voter registration station 10. If there are multiple matches, all are displayed. In step 264, the operator selects a name from the list generated in steps 261–264. In steps 265 and 266, the record matching that name is retrieved and displayed. Step 267 calls the Record Main process of FIG. 2E, so that the voter,s record may be updated and a determination made whether the voter has already been certified to vote for that election.

Figure 2G:
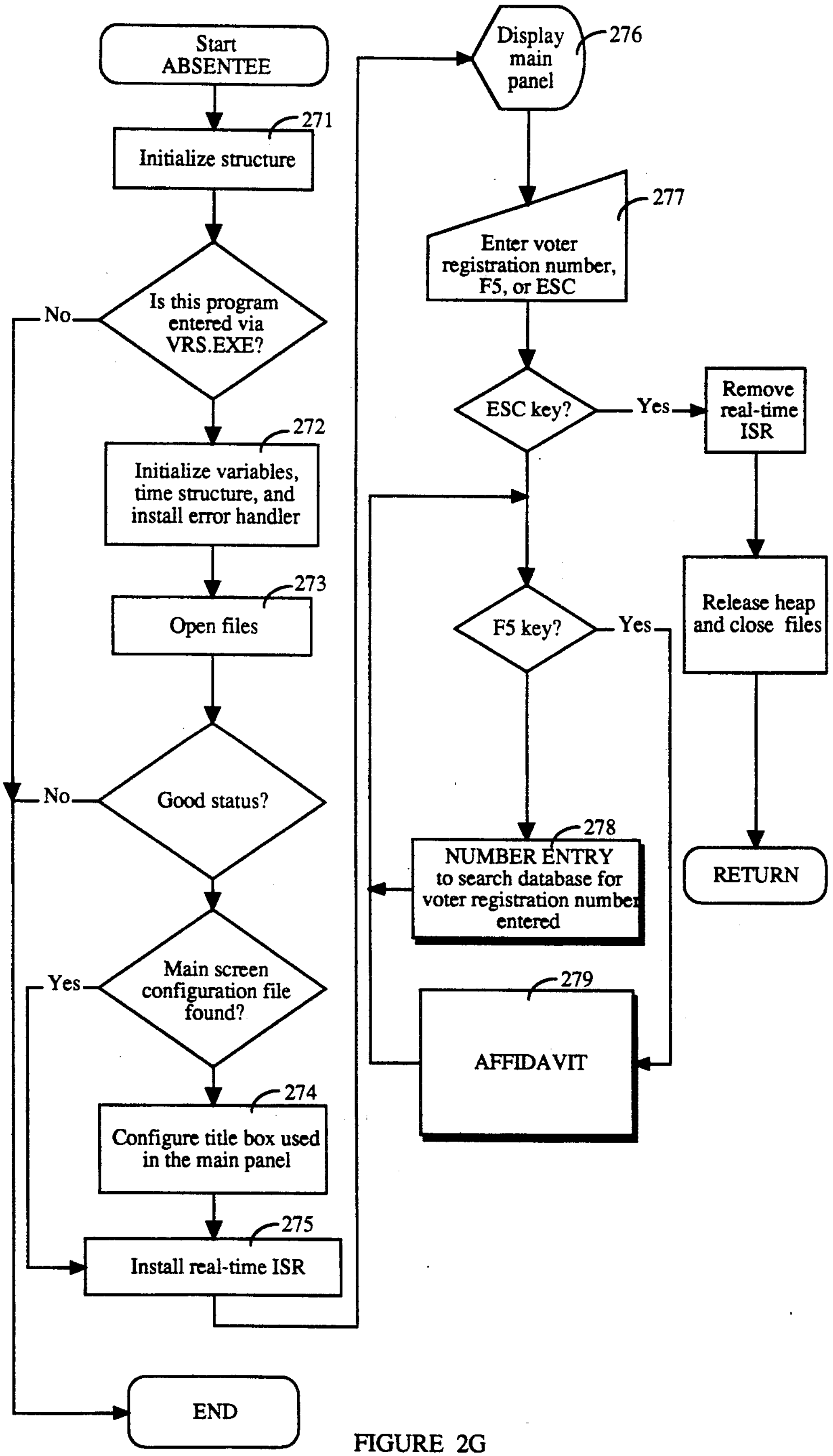
FIG. 2G is a flow chart of the Absentee process called by Registration Main.
Figure 2H:
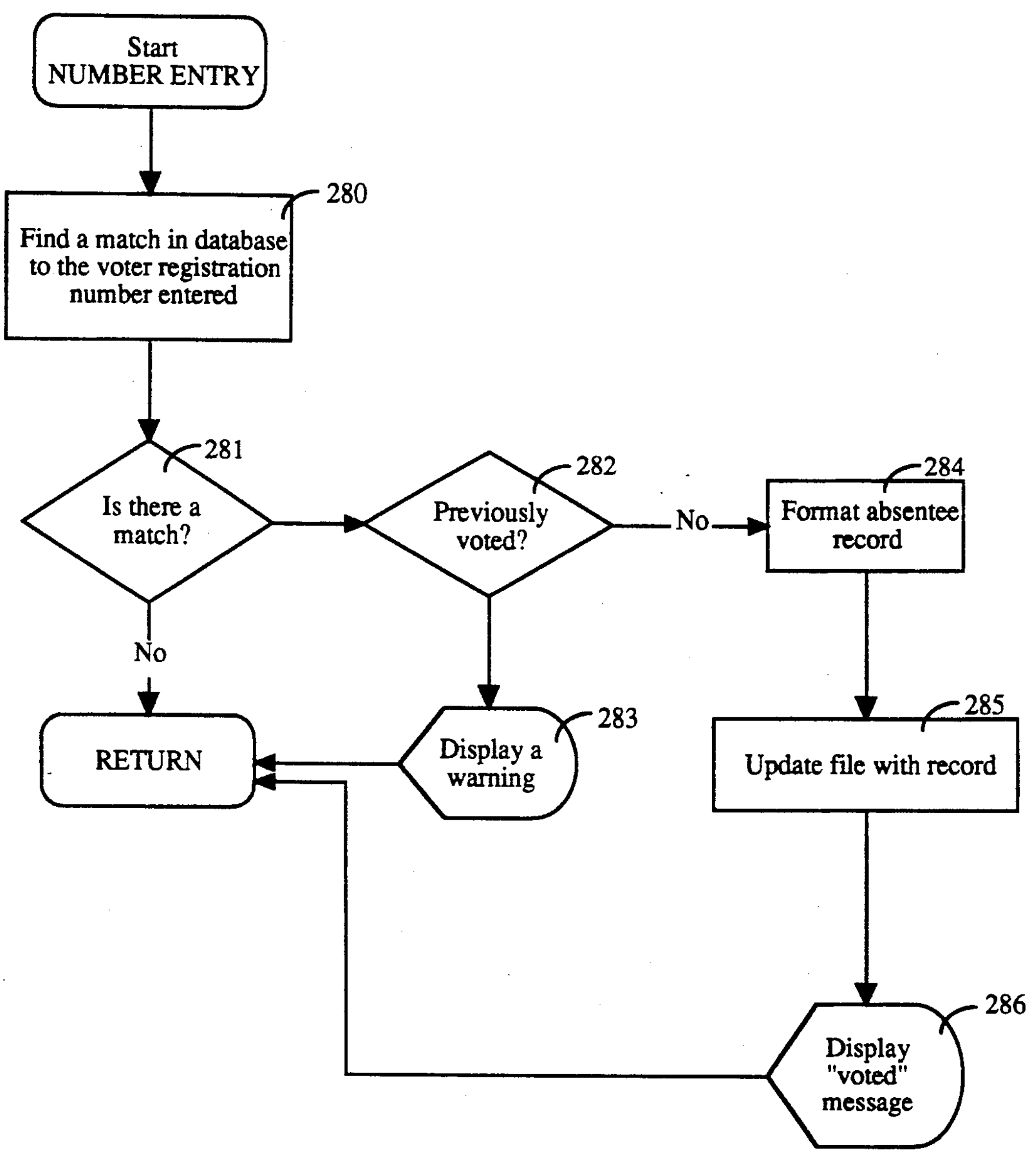
FIG. 2H is a flow chart of a Number Entry process called by Absentee.
Figure 2I:
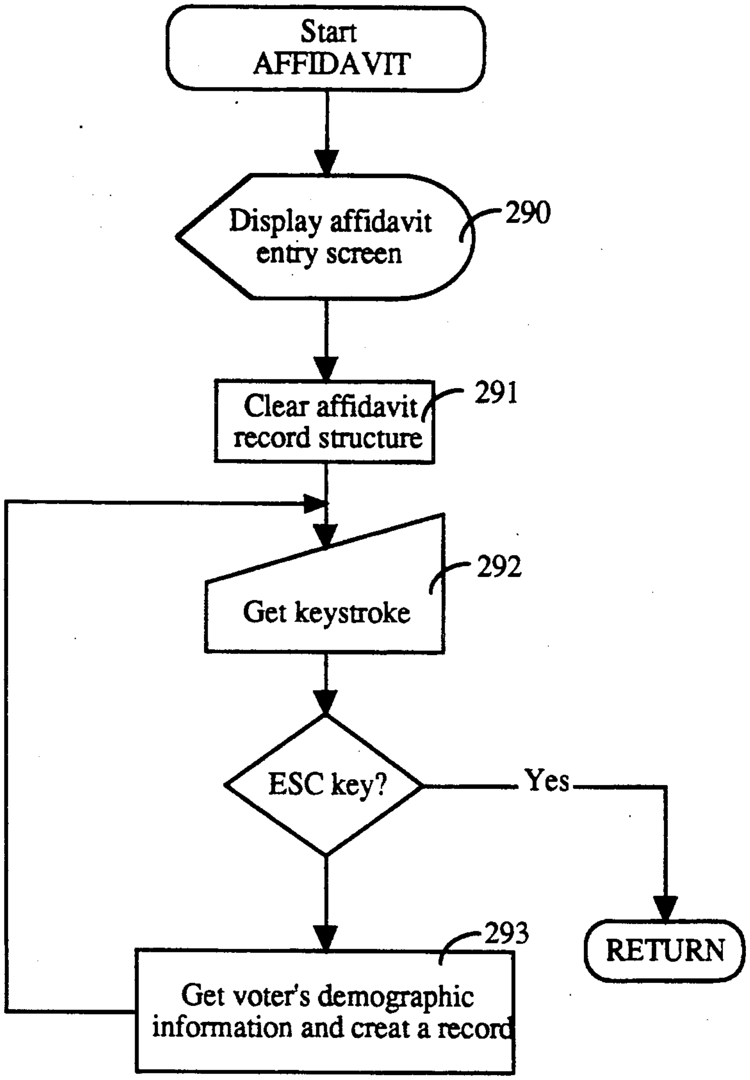

Referring again to FIG. 2A, a third option of the voter registration process is an Absentee process, which is illustrated in FIGS. 2G and 2H. This process is used during an absentee voting period. Referring to the Absentee process of FIG. 2G, steps 271–275 are initialization steps. Step 276 displays a panel containing information about the type of election, as entered during the Configuration process. Step 277 receives the voter,s registration number, either from keyboard input or via bar code reader 24. Step 278 calls a Number Entry process, which is illustrated in FIG. 2H. In step 279, which is used if the voter does not have a registration card, the operator calls an Affidavit process, which generates and displays an affidavit form on which the voter,s information may be entered.

Referring now to FIG. 2H, steps 280 and 281 of the Number Entry process determine whether there is a match for the voter's number in database 13, and inform the operator. If the registration number is valid, step 282 is determining whether the voter has previously voted in the election. If so, step 283 is informing the operator that the voter has already been certified. Steps 284–286 are creating an absentee registration record for the voter and writing the record to one or more memory devices, such as database 13.

Vote Entry Controller

Referring again to FIG. 1, vote entry controller 11 comprises a computer 40, coupled to a keyboard 41, a display 42, mass data storage device 43, and printer 44. In addition, computer 40 is coupled to dataport switch 35, which allows computer 40 to communicate with vote entry stations 12. Optionally, the computer 40 is also in communication with database 14, via a telephone line 36 or other data communications link.

FIGS. 3A–3G illustrate the node control process performed by vote entry controller according to programming of computer 40. In general, the programming monitors and activates each vote entry station 12, receives downloaded votes, stores the votes in storage device 43, and keeps track of the number of voters having voted at each vote entry station 12. A feature of the node control process is that although the voter,s selections are downloaded to vote entry controller no information about the voter is stored within vote entry controller 11. The operator at vote entry controller 11 sees a screen that displays available vote entry stations 12 and directs the voter to a particular idle vote entry station 12. The operator enters the identity of that station 12 to the node control process, which sends a code to activate a voting session for the voter and changes the status of that station 12 from idle to busy.

Figure 3A:
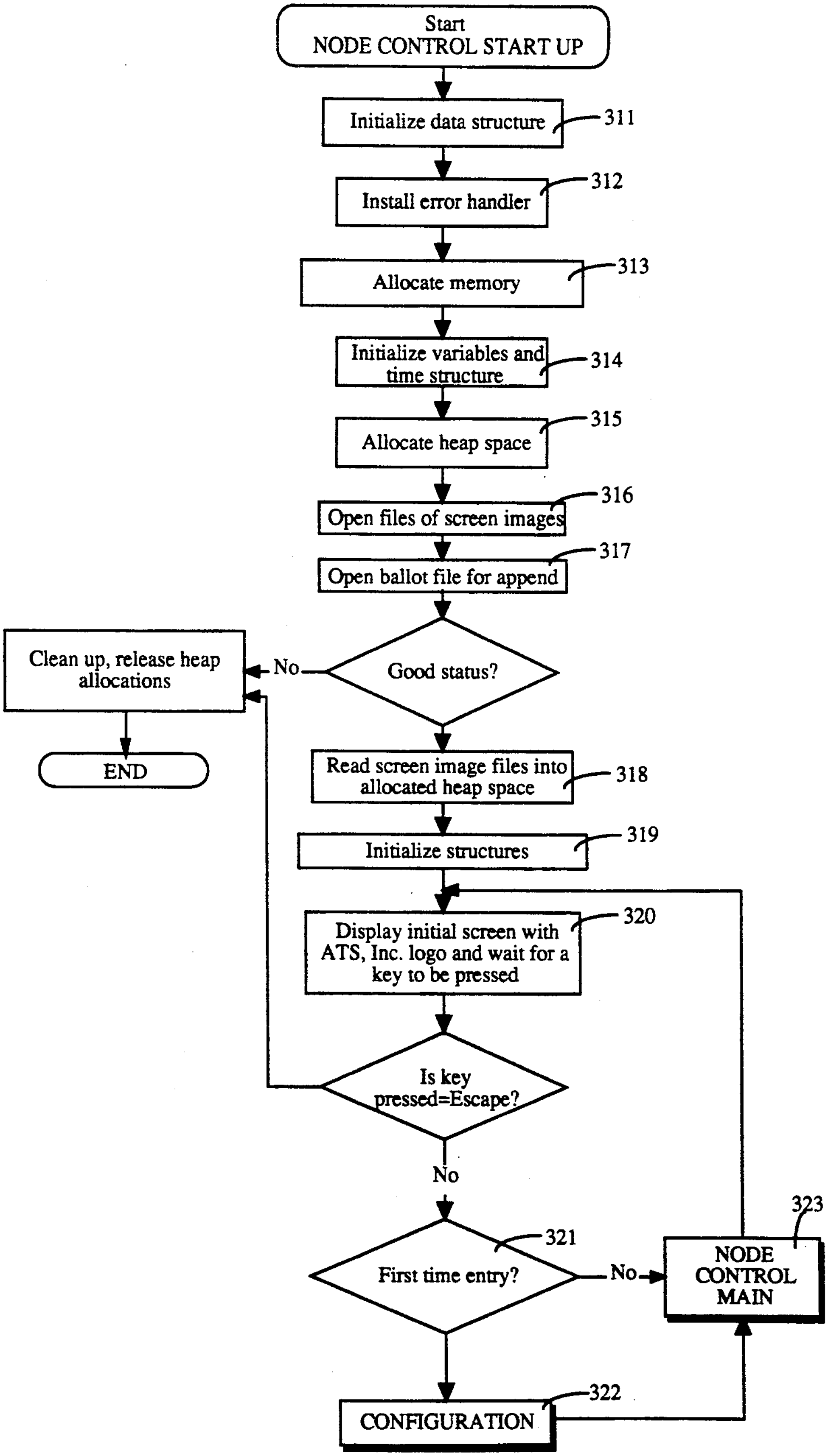
FIG. 3A is a flow chart of a Node Control Start-Up process performed by vote entry controller.
Figure 3B:
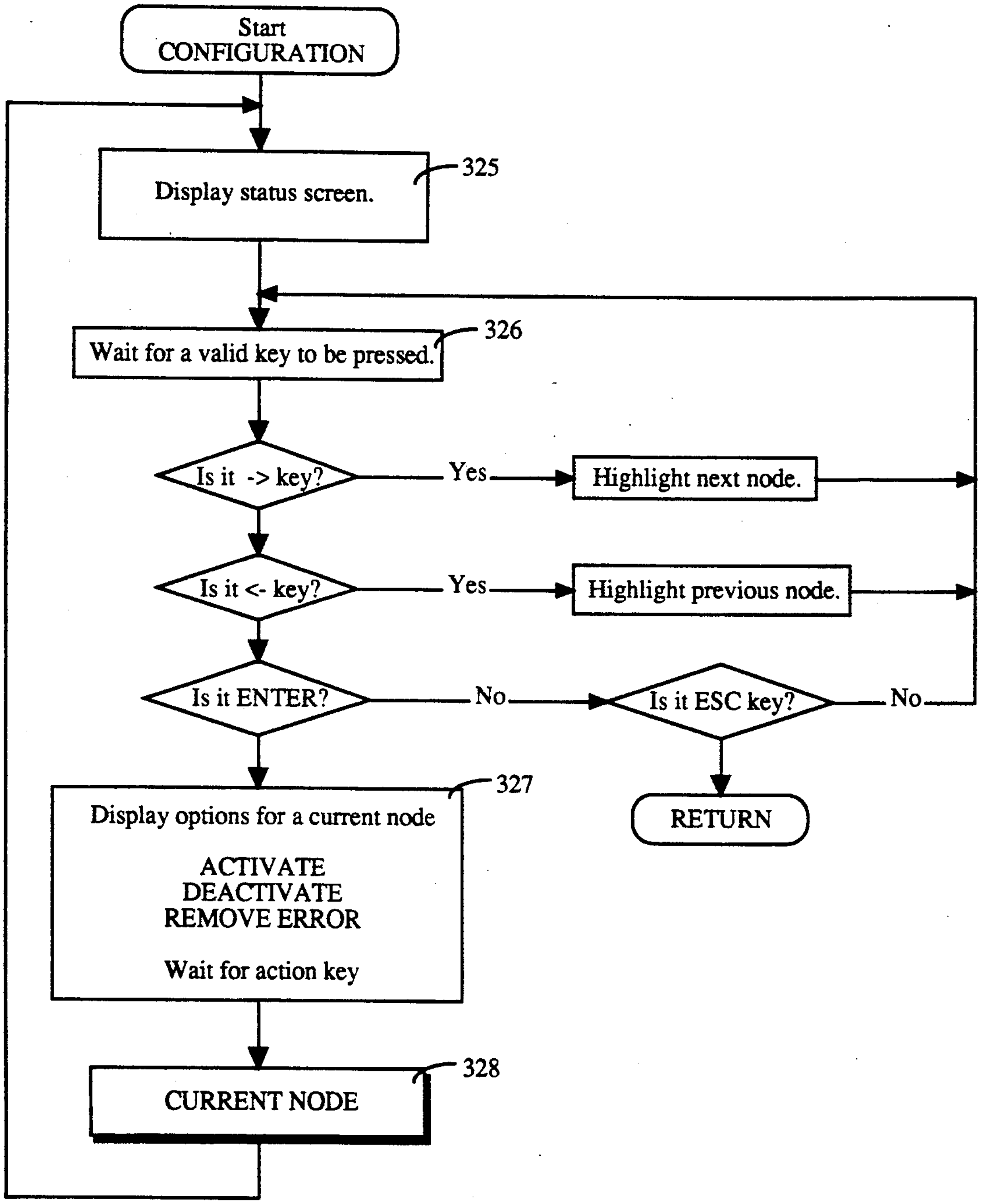
FIG. 3B is a flow chart of a Configuration process called by Node Control Start-Up.
Figure 3C:
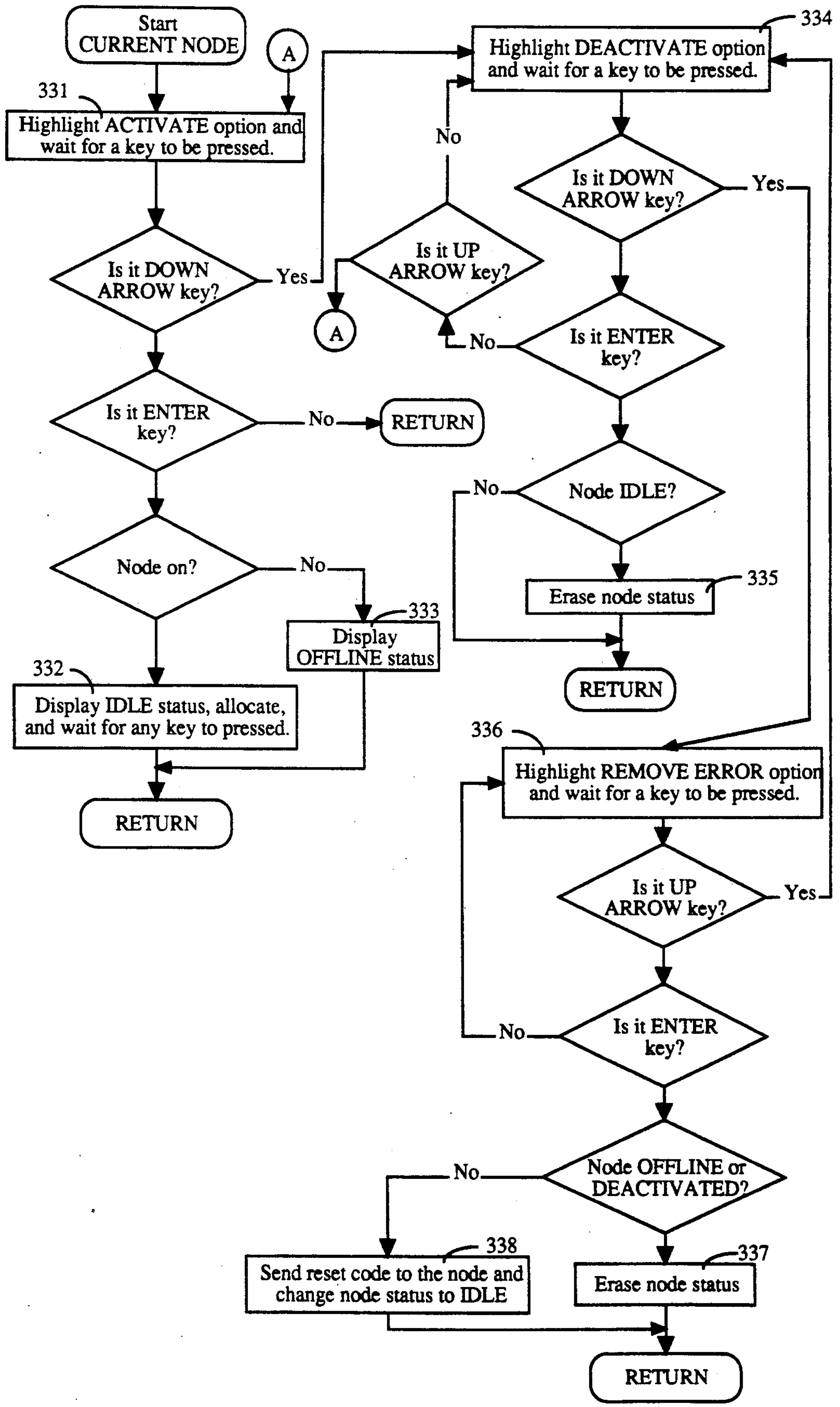
FIG. 3C is a flow chart of a Current Node process called by Configuration.

FIG. 3A illustrates a Node Control Start-Up process, which after performing various initialization tasks in steps 311–320, determines whether the entry is a first time entry in step 321. If so, step 322 calls a Configuration process, which is illustrated in FIGS. 3B and 3C. Otherwise, step 323 calls a Node Control Main process, which is illustrated in FIGS. 3D–3G.

Referring now to FIG. 3B, step 325 of the Configuration process displays a status screen, on which each vote entry station 12 and its status is represented. The status information includes the number of voters having voted at each station 12. In step 326, the operator selects one of the nodes, which is designated as the current node. Step 327 is displaying a current node menu, from which the operator selects an action, namely, activate, deactivate, or remove error. Once the selection has been entered, step 328 calls a Current Node process, which is explained in connection with FIG. 3C.

Referring to FIG. 3C, steps 331–333 of the Current Node process are performed when the current node is to be activated. The node is checked to determine if it is online, and if so, it is assigned an idle status. Steps 334 and 335 are performed when the current node is to be deactivated. In this case, the node's status is erased as soon as that node is idle. Steps 336–338 are performed to correct an error in the status of the current node. If the link connection between a vote entry station 12 and vote entry controller 11 is lost, an error remove code send to the vote entry station 12 causes the programming to reset itself to the first ballot screen and prompts the voter to re-enter his or her votes.

Referring again to FIG. 3A, as stated above, unless the entry is a first time entry, step 323 of the Start-Up process calls a Main process.

Figure 3D:
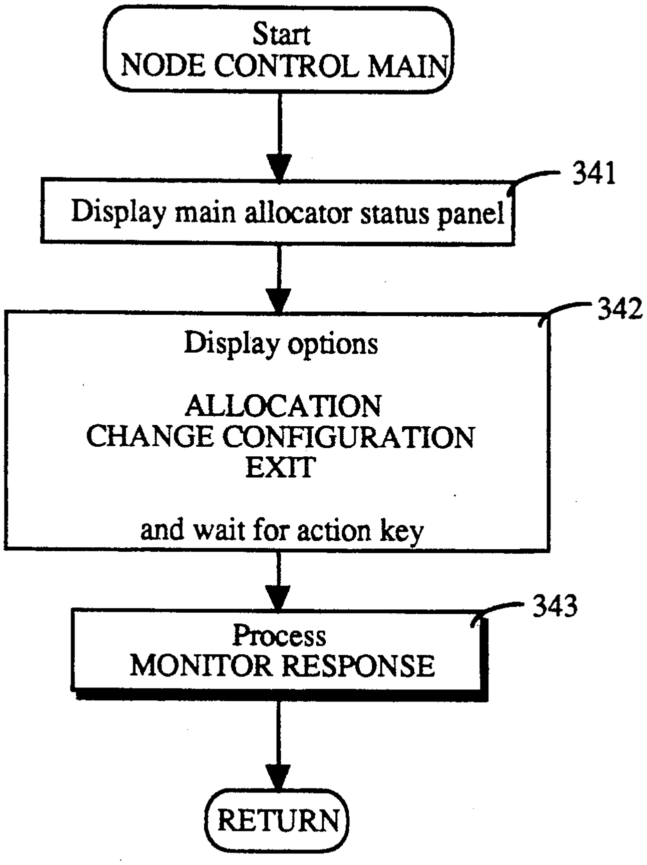
FIG. 3D is a flow chart of a Node Control Main process called by Node Control Start-Up.

FIG. 3D illustrates main logic flow of the Node Control Main process. Steps 341 and 342 display a status panel, from which the operator selects either a Change Configuration, an Allocation, or an Exit process. Step 343 is calling a Monitor Response process, which is illustrated in FIGS. 3E-3G.

Figure 3E:
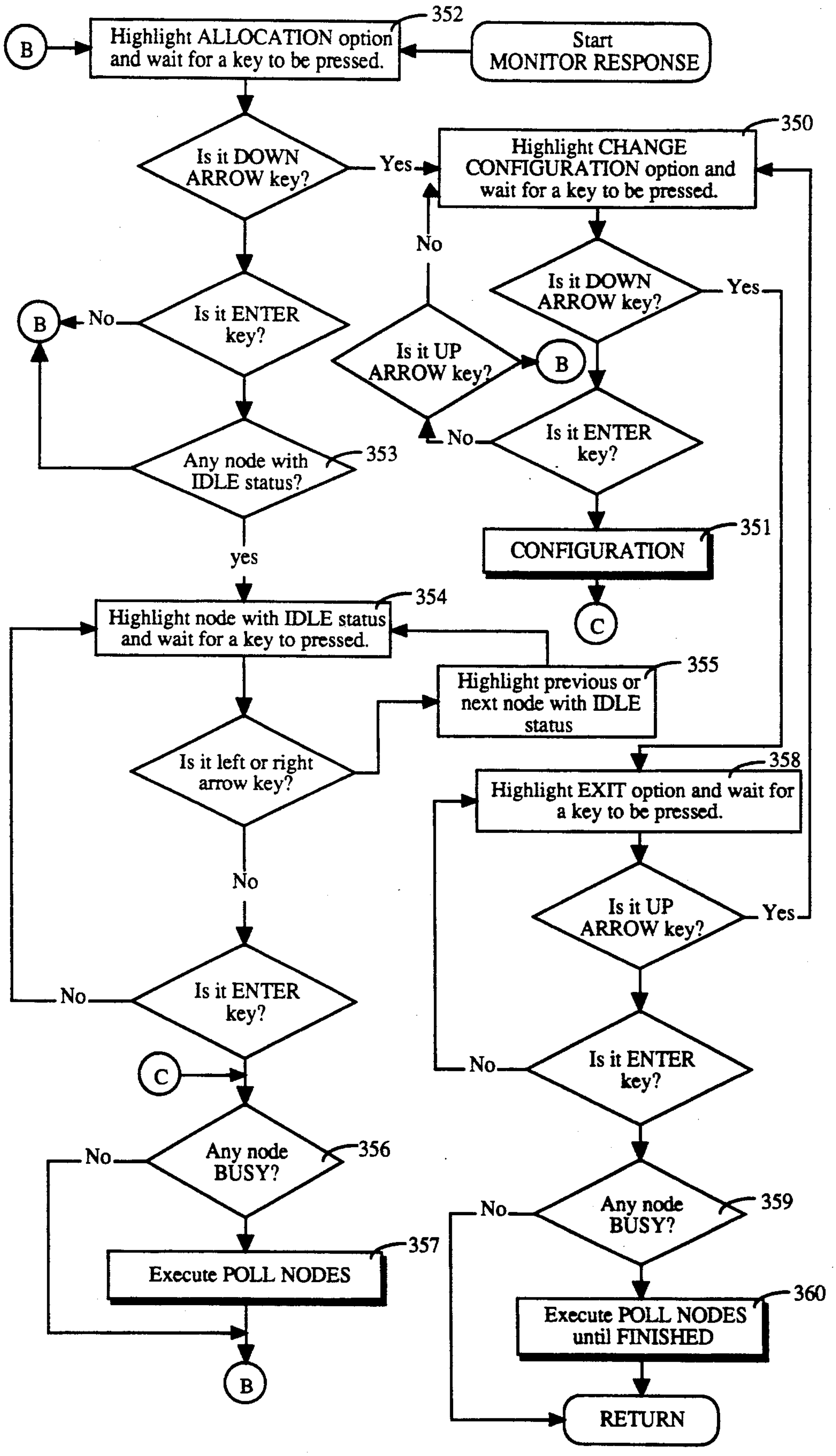
FIG. 3E is a flow chart of a Monitor Response process called by Node Control Main.

FIG. 3E illustrates the main Monitor Response logic flow, which performs differently according to the selection entered by the voter in step 342 of the Node Control Main process. If the Change Configuration process was selected, steps 330 and 331 are calling the Configuration process that was described above in connection with FIGS. 3B and 3C. The process then re-enters at point C. If the Allocation process is selected, steps 352-354 determine whether there is a node with an idle status and inform the operator. Step 356 determines if there are any busy nodes. If so, step 357 calls a Poll Nodes process, which is illustrated in FIG. 3F. The Poll Nodes process continues to run until an action key is pressed in response to step 342 of the Main process. If the Exit process is selected, steps 358-360 determine if there are any busy nodes, and if so, call the Poll Nodes process to wait for all activated vote entry stations 12 to become idle before exiting.

Figure 3F:
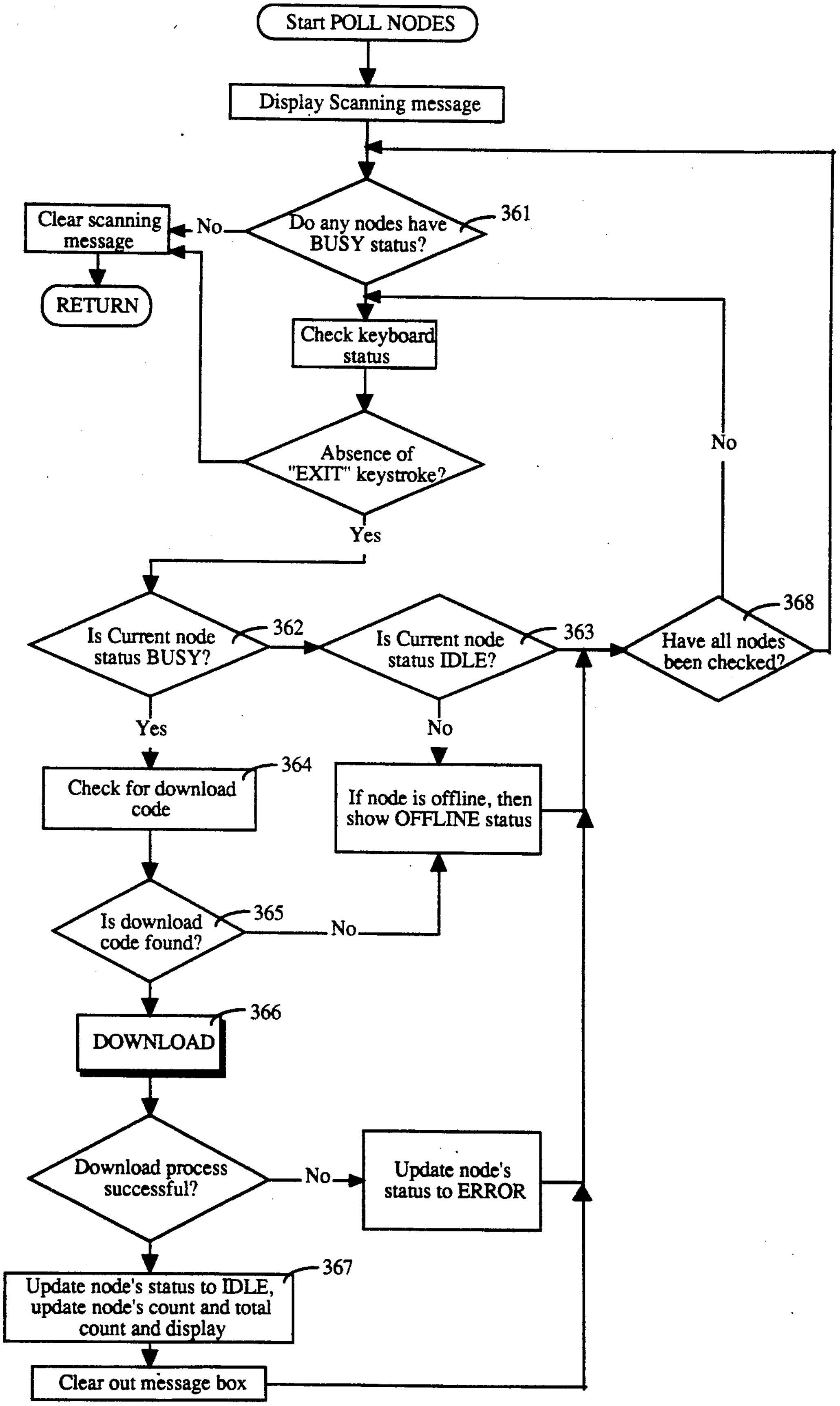
FIG. 3F is a flow chart of a Poll Nodes process called by Monitor Response.

Referring to FIG. 3F, the Poll Nodes process constantly updates the status of all vote entry stations 12. The possible status's are: offline, idle, busy, and downloading. Step 361 is determining if there are any busy nodes. If so, steps 362 and 363 select a current node and determine if that node is busy or idle. If the node is busy, steps 364 and 365 check for a download code associated with that node, and if such a code is present, step 366 calls a Download process, which is illustrated in FIG. 3G. Upon return from Download, step 367 is changing the node's status to idle, and incrementing the counts representing the total voters having used that station 12 and the total number of voters having used all stations 12. If the result of steps 362 and 363 is a determination that the current node is idle, step 368 determines whether there are additional nodes to be polled, and if so steps 362-367 are repeated.

Figure 3G:
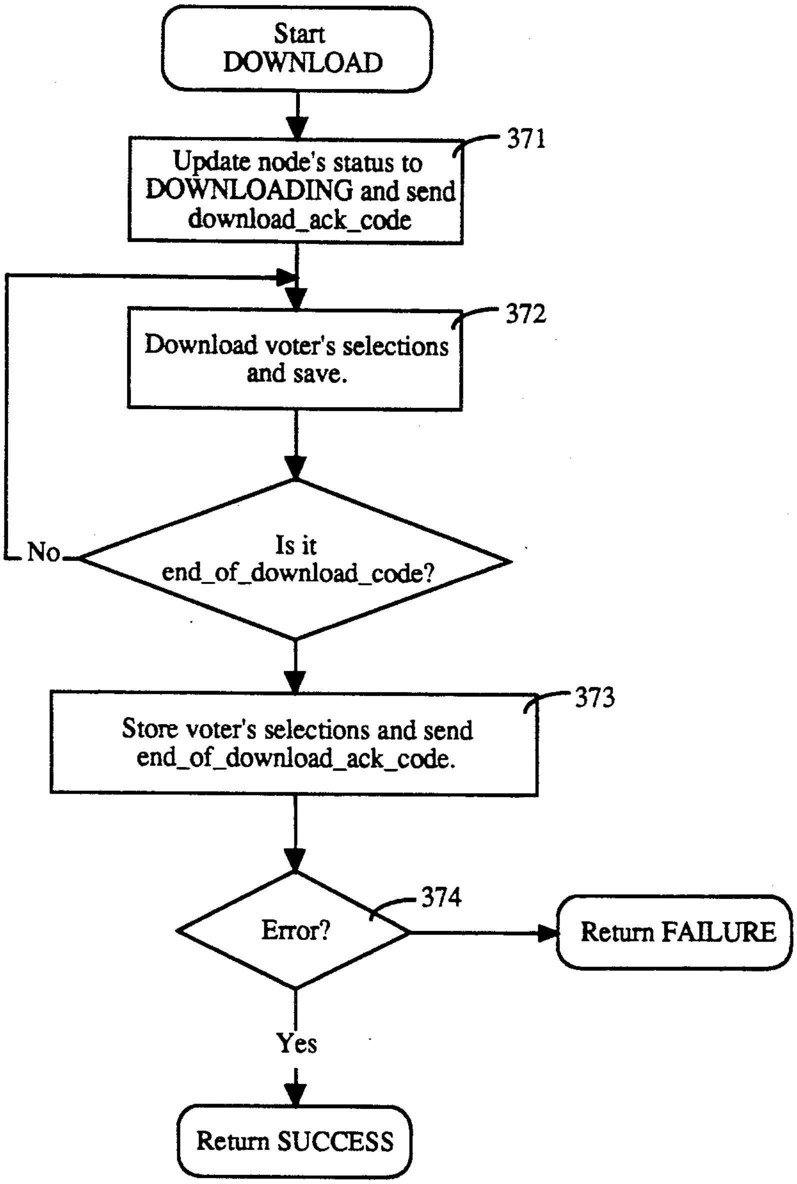
FIG. 3G is a flow chart of a Download process called by Poll Nodes.

FIG. 3G illustrates the Download process performed by vote entry controller 12, which is called when a download code is found during step 365 of the Poll Nodes process. In step 371, the process updates the status of the station 12 and sends an acknowledgement code to the station 12. In step 372, the voter,s selections are downloaded and stored in storage device 43. At the end of the download, the process sends an end-of-download acknowledgement to the station 12. Step 374 is checking for errors, after which the process returns to the calling process or returns an error message. The Download process performed by each vote entry station 12 is described below in connection with FIG. 5I.

Data storage device 43, which stores the data downloaded in the Download process, may be an electromagnetic media such as a portable data disk, fixed hard disk, or tape. Voting data that is stored on a portable data storage media can be manually transported to a central database 14 after the vote entry phase of the election. Alternatively, the data may be communicated electronically, using known data communication techniques and a communication means 36.

Vote Entry Stations

Referring again to FIG. 1, each vote entry station 12 comprises a computer 61, a display 62, and a keyboard 63 having specially designed keys. Each computer 61 has a data output port for transferring data to vote entry controller 11, and may also have a printer port for communicating with a printer 65. Display 62 displays the responses of computer 61 to commands entered by the voter via keyboard 63. Each vote entry station 12 also has local data storage device 66 for storing votes. All input and access to the data and programming of computer 61 and data storage device 66 is secure.

Figure 4:
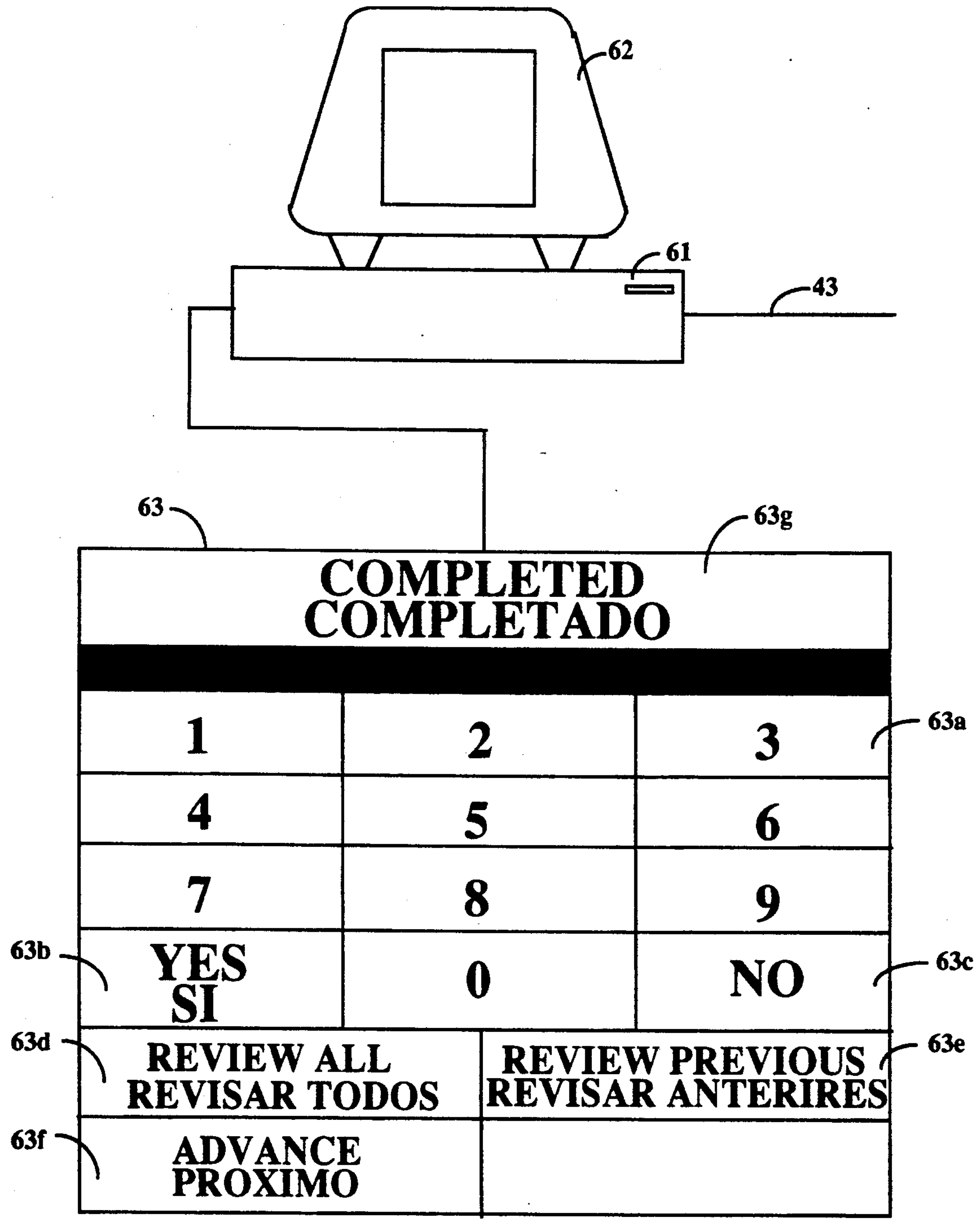
FIG. 4 illustrates the keyboard layout used with each vote entry station.

FIG. 4 illustrates keyboard 63, which has a group of number keys 63*a*, a YES key 63*b*, a NO key 63*c*, a REVIEW ALL key 63*d*, a REVIEW PREVIOUS key 63*e*, an ADVANCE key 63*f*, and a COMPLETED key 63*g*. The operation of these keys is explained in connection with the Vote Entry process described below.

FIGS. 5A-5I illustrate the Vote Entry process, as implemented with programming of computer 61. In general, each vote entry 12 activates a Vote Entry program upon receiving an activation code from vote entry controller 11. When the voter is finished entering votes and enters "complete", the process downloads the votes to vote entry controller 11, and prohibits further voting until a new activation code is received. In the case of write-in votes, the process prints a write-in ballot having office titles with corresponding blank lines on printer 65. The voter then removes the ballot from printer 65, writes candidates' names, and places the ballot in a ballot box.

Figure 5A:
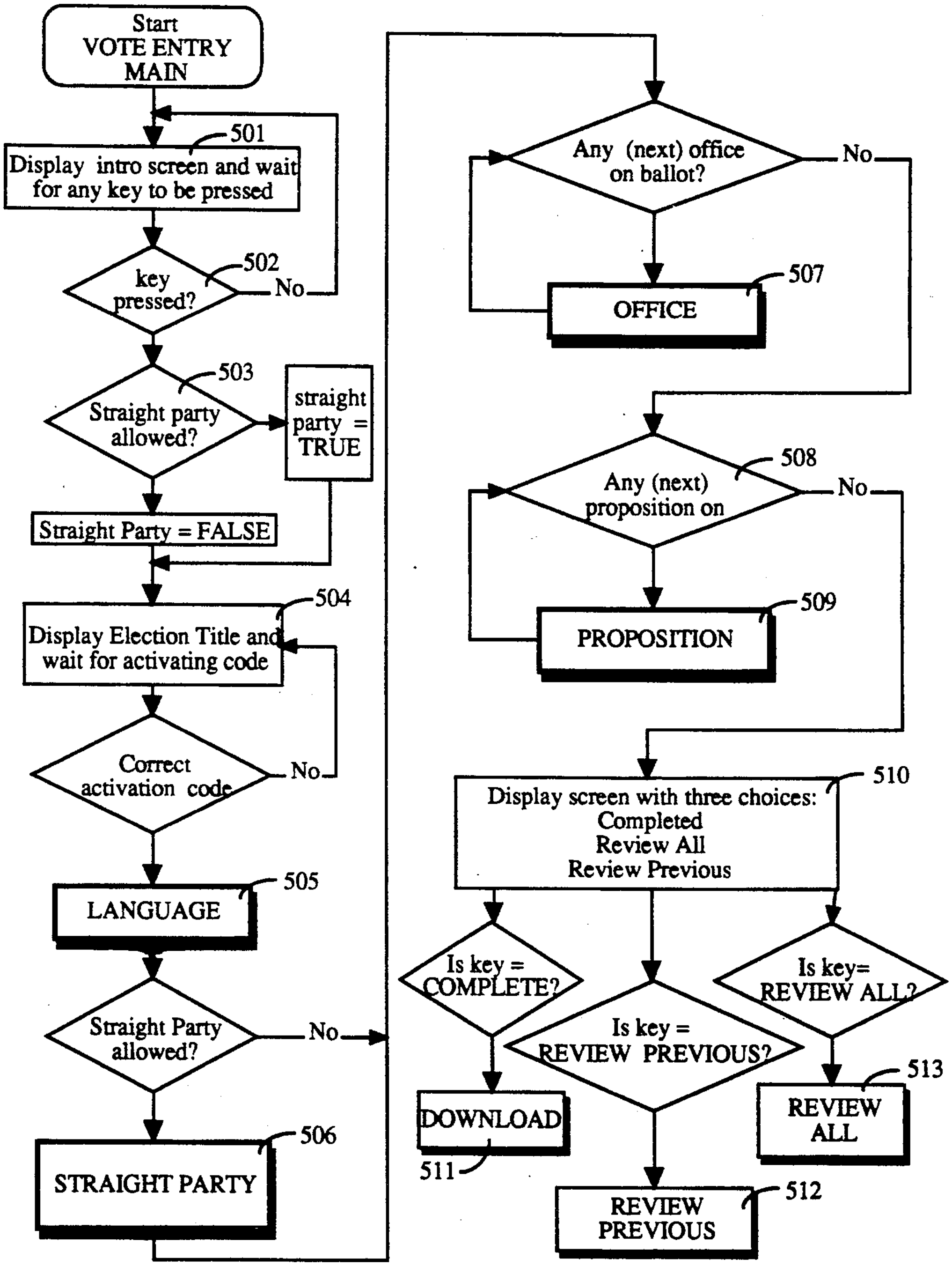
FIG. 5A is a flow chart of the Vote Entry Main process performed by each vote entry station.

FIG. 5A illustrates the main logic flow of the Vote Entry process. The operations begin at step 501, when the computer 61 causes an introduction screen to be displayed. The process waits at step 501 until a key is pressed on keyboard 63. When a key is pressed, step 503 determines whether vote entry stations 12 have been programmed to permit straight party voting, and a code is set accordingly. Step 504 displays the election title, which indicates what election is being held that day. Then, the process loops at step 504, waiting for vote entry controller 11 to transmit an activating code to vote entry station 12. When the activation code is received, step 505 sends an acknowledgement code back to vote entry controller 11, and calls a Language process, which is explained in connection with FIG. 5B.

Once step 505, associated with choice of language, is completed, step 506 calls a Straight Party process, which allows the voter to make a straight party selection, if that type of voting is permitted in the election. The Straight Party process is explained in connection with FIG. 5C.

Once step 506, associated with Straight Party voting is completed, step 507 calls an Office process, which displays series of ballot screens, one at a time, and permits the voter to enter candidate selections. The Office process is explained below in connection with FIG. 5D.

After the Office process associated with step 507 is complete, step 508 determines whether the vote entry process has been configured to include propositions. If so, step 509 calls a Proposition process, which is explained below in connection with FIG. 5H.

After the Proposition process associated with step 509 is completed, step 510 displays a menu that provides three choices for the voter: (1) completed, (2) review all, and (3) review previous. Each of these selections corresponds to a key on keyboard 63. If the voter enters COMPLETE, step 510 calls the Download process, which was explained above in connection with FIG. 3G. If the voter enters REVIEW PREVIOUS, step 512 calls a Review Previous process, which permits the voter to review previous display screens and change vote selections if desired. If the voter enters REVIEW ALL, step 513 permits the voter to review and change all selections from the beginning. The Vote Entry process of FIG. 5A is then complete.

Figure 5B:
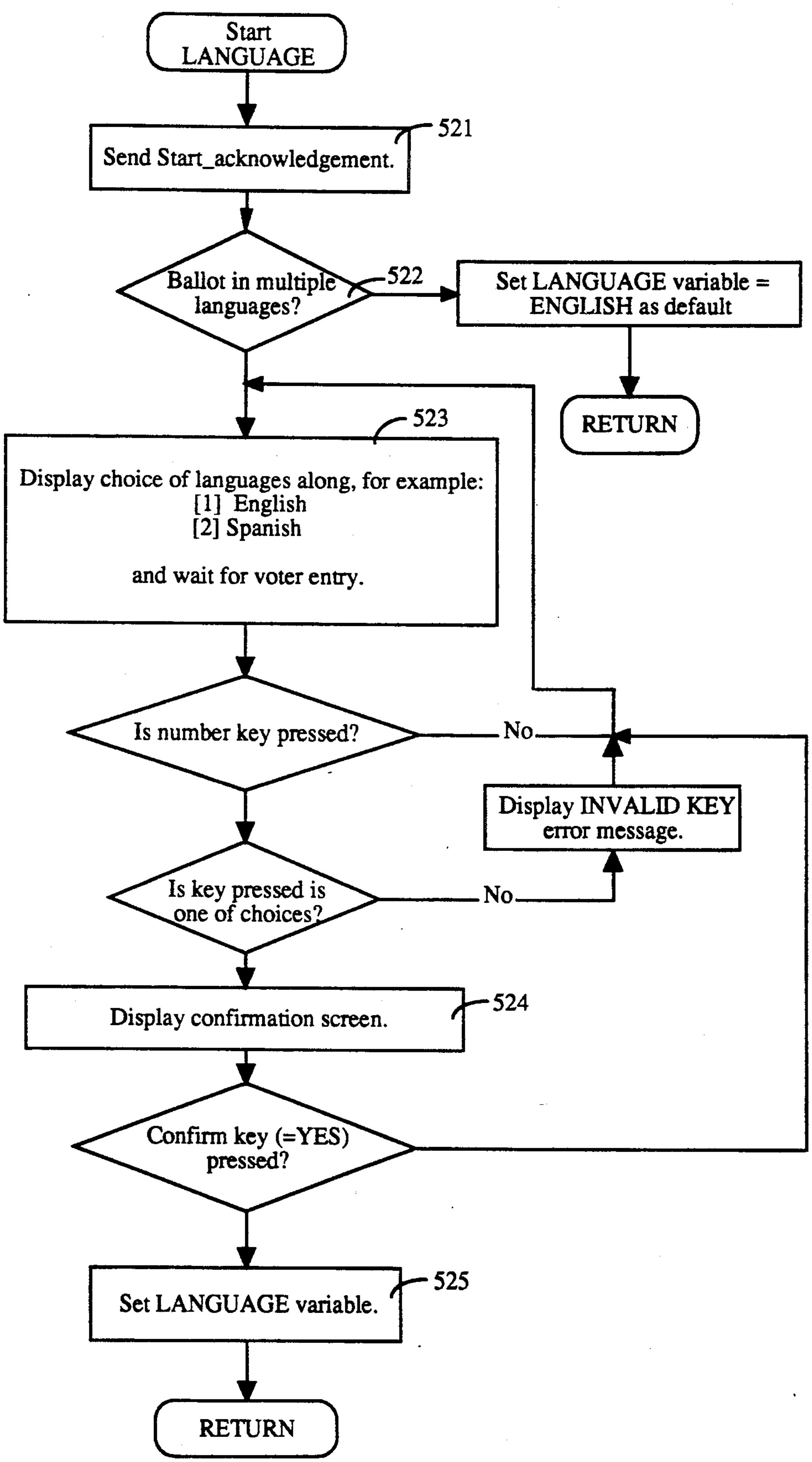
FIG. 5B is a flow chart of the Language process called by Vote Entry Main.

Referring to FIG. 5B, the Language process called in the main Vote Entry process of FIG. 5A permits the voter to view a ballot in a selected language. Step 521 sends a start acknowledgement code that causes the status of vote entry station 12 to change from idle to busy. Step 522 determines if the programming has been configured for more than one language. If so, step 523 displays a message in a plurality of languages, offering the voter a choice of languages in which future messages will appear. The message is displayed in such a way that voters indicate their choices simply by pressing a number key 63*a* corresponding to the language that they desire. Step 524 displays a message asking the voter to enter confirmation of the selection. Step 525 sets a language variable to a value corresponding to the choice made by the voter. This variable causes all subsequent screens on display 62 to be displayed in the voter,s choice of language. Once this action is taken, the Language process is completed and the processing returns to the main Vote Entry process of FIG. 5A.

Figure 5C:
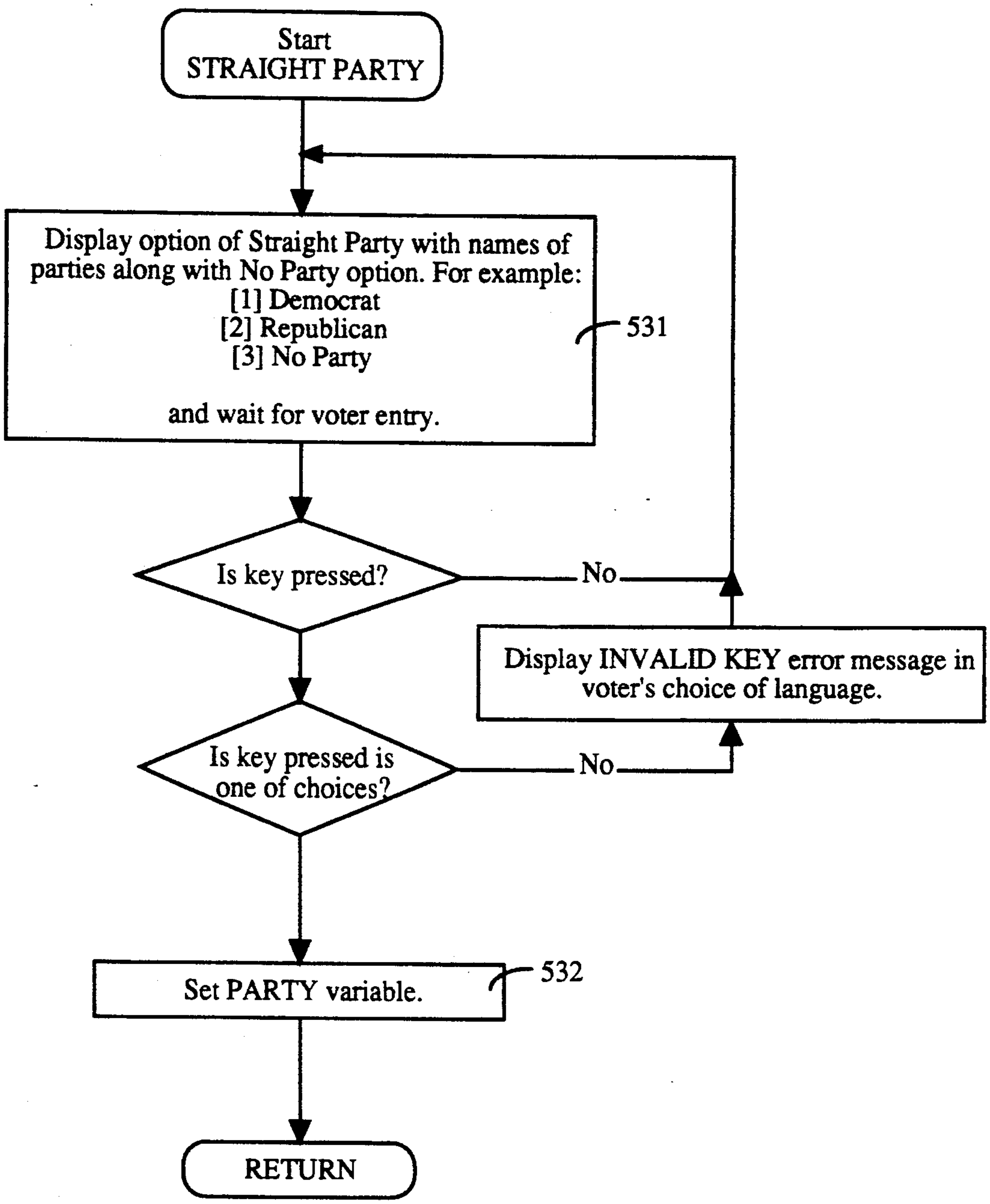
FIG. 5C is a flow chart of the Straight Party process called by Vote Entry Main.

Referring to FIG. 5C, the Straight Party process called in the Vote Entry process of FIG. 5A permits the voter to choose to cast all votes for one of a list of parties. Step 531 displays a menu that allows the voter to select a particular party. After the voter makes a selection, step 532 sets a party variable to the value of the voter's selection. As explained below in connection with the Office Voting process of FIG. 5D, if the party variable is set, the names of candidates in that party are highlighted on the ballot. After step 532, the Straight process is completed and the processing returns to the main Vote Entry process of FIG. 5A.

Figure 5D:
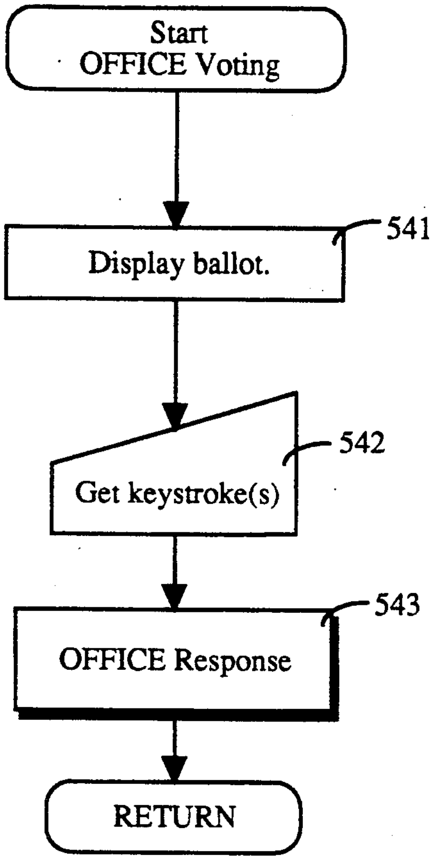
FIG. 5D is a flow chart of the Office Voting process called by Vote Entry Main.

Referring to FIG. 5D, the Office Voting process called by the Vote Entry process of FIG. 5A interactively displays ballots and receives voter selections. A sample office voting ballot is illustrated in FIG. 6. The Office Voting process begins with step 541, which displays a ballot screen for each office. The display includes the list of candidates with a unique number associated with each candidate, the number of candidates that can be selected, and other relevant information. If the party variable was set in response to the Straight Party process, the name of the candidate associated with that party is highlighted, and the voter may select that candidate by simply entering the Advance key 63*f* and advancing to the next office. Once the ballot has been displayed and the voter has entered votes via keyboard 63, step 542 reads the voter's entries, and calls an Office Response process, which is explained below in connection with FIG. 5E. Referring again to FIG. 5A, the Office Voting process repeats until all ballots have been displayed so that the voter has had an opportunity to select candidates from all ballot screens.

Figure 5E:
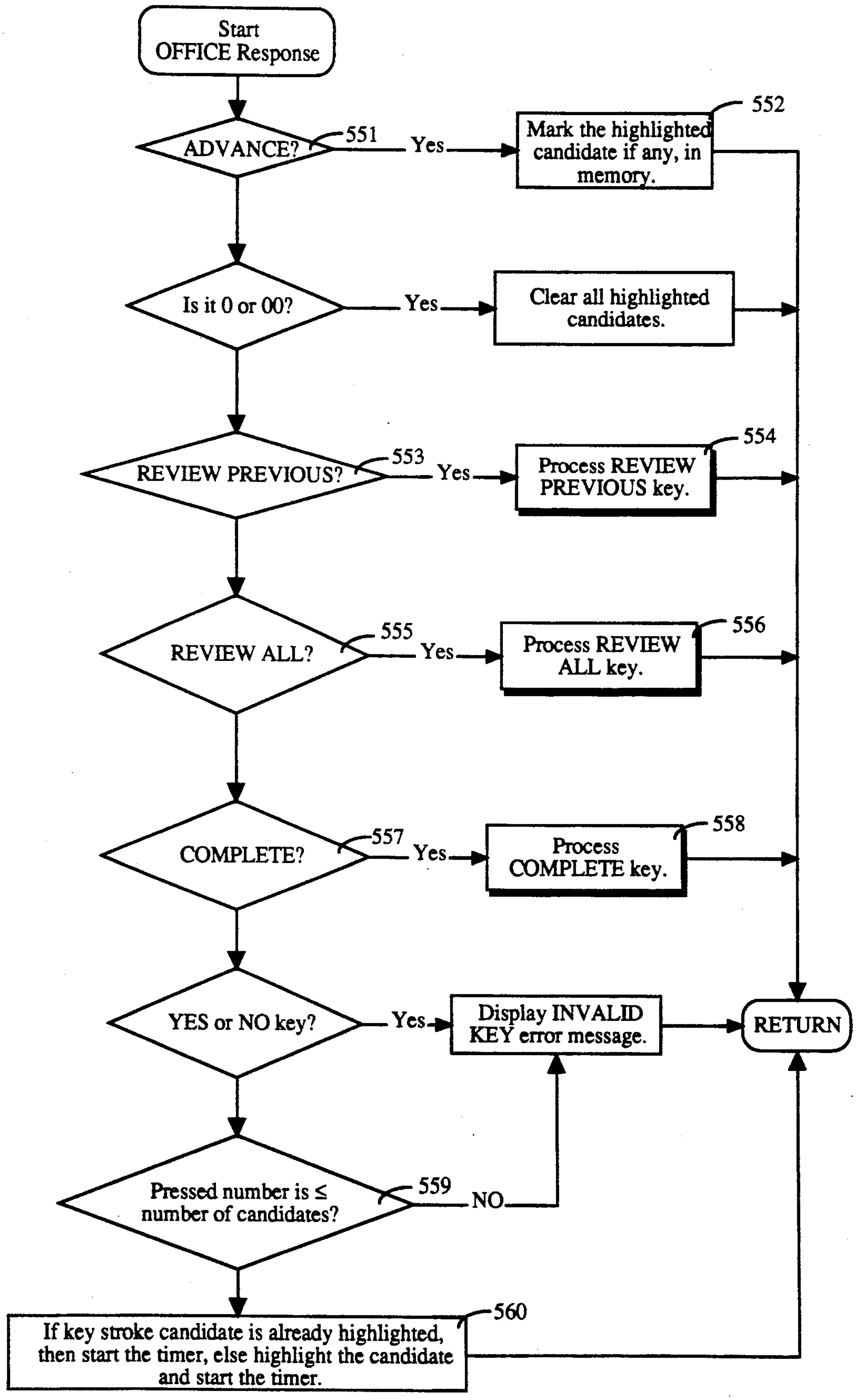
FIG. 5E is a flow chart of the Office Response process called by Office Voting.

Referring to FIG. 5E, the Response process associated with a key being pressed after a ballot is displayed begins with step 551, which determines if the ADVANCE key 63*f* was pressed. If it was, step 552 stores the candidate's name into a variable assigned to the displayed office. Step 553 determines if the REVIEW PREVIOUS key 63*c* was pressed. If so, then step 554 calls a process that permits the voter to review the prior ballot display. Step 555 determines if the REVIEW ALL key 63*e* was pressed. If so, step 556 calls a process that permits the voter to review all previous ballot displays. Step 557 determines if the COMPLETE key 63*g* was pressed. If so, step 558 calls a Complete process, which is explained below in connection with FIG. 5F.

Steps 559 and 560 of the Response process determine that a valid candidate has been selected and give the voter a short time period to change the selection. If the time elapses with no voter entry, the next ballot is displayed, and if a selection has been made in step 542 of the Office Voting process, that selection is stored. This "timeout" period prevents undue delay at each vote entry station 12. More specifically, step 559 determines if the key pressed is one of the number keys 63*a*, and whether the number associated with the pressed key is less than or equal to the number of candidates displayed on the ballot. In step 560, if the candidate whose number corresponds to the number associated with the pressed key is highlighted on display 62, there is a five second wait, and then the Office Voting process ends for that ballot. Otherwise, step 560 highlights the candidate's name, waits for five seconds, and then terminates the Office Voting process. As stated above, each Office Voting cycle represents one ballot, and the Office process is repeated by the main logic flow of the Vote Entry process if there are more ballots to be voted upon by the voter.

Figure 5F:
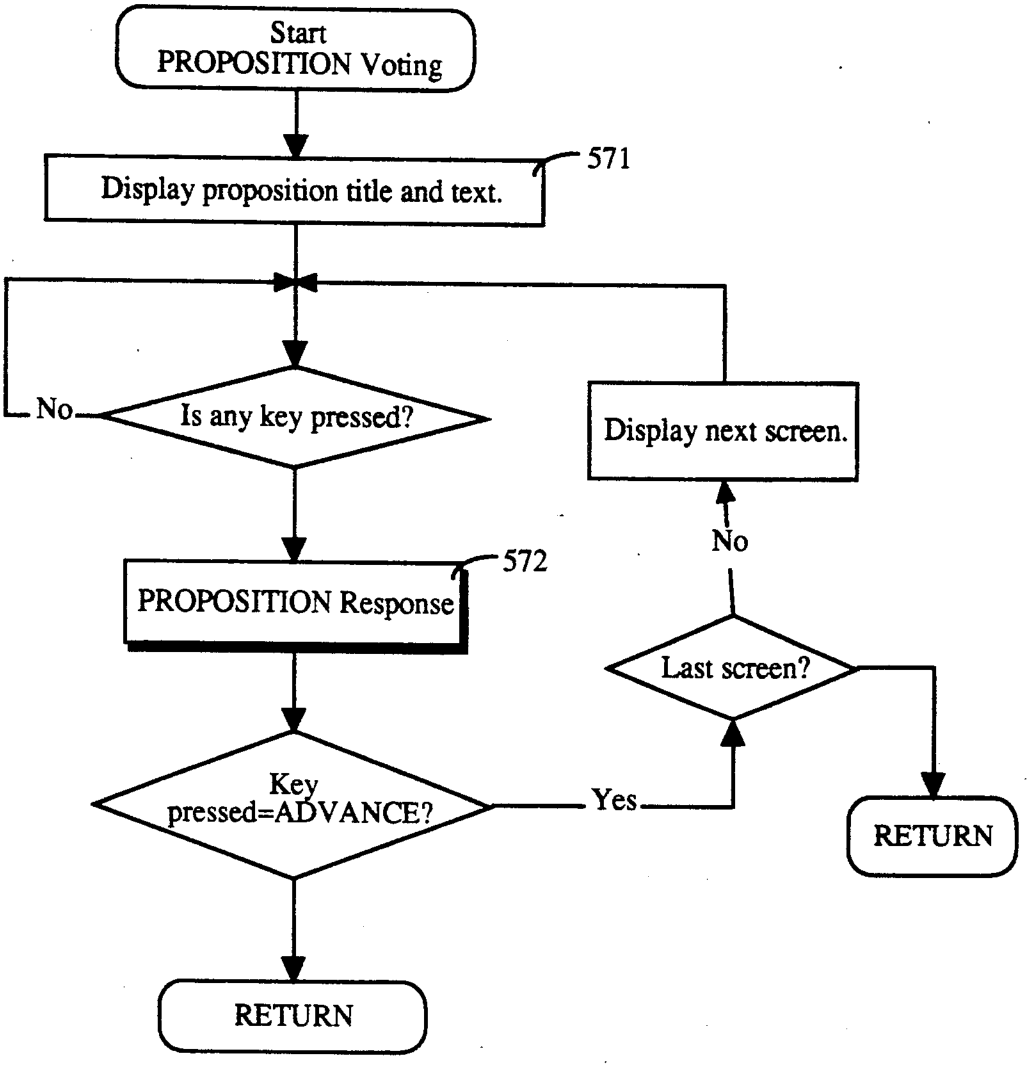
FIG. 5F is a flow chart of the Proposition Voting process called by Vote Entry Main.
Figure 7:
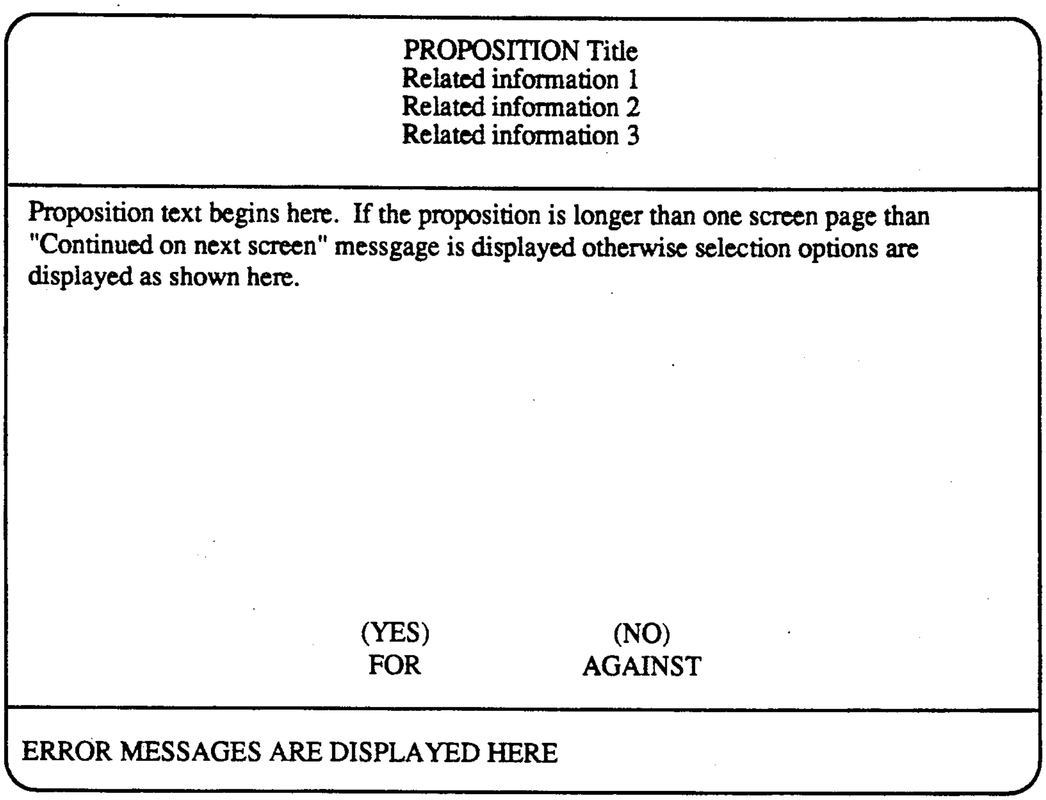
FIG. 7 illustrates a sample proposition voting ballot displayed by vote entry station.

FIG. 5F illustrates the Proposition Voting process, which is called by the main Vote Entry process after all ballots have been displayed and selections entered. The process begins with step 571, with a display of the title and text of the proposition. A sample proposition voting ballot is illustrated in FIG. 7. If a Yes key 63*d* or a NO key 63*c* is pressed, step 572 calls a Proposition Response process, which is described in connection with FIG. 5G.

Figure 5G:
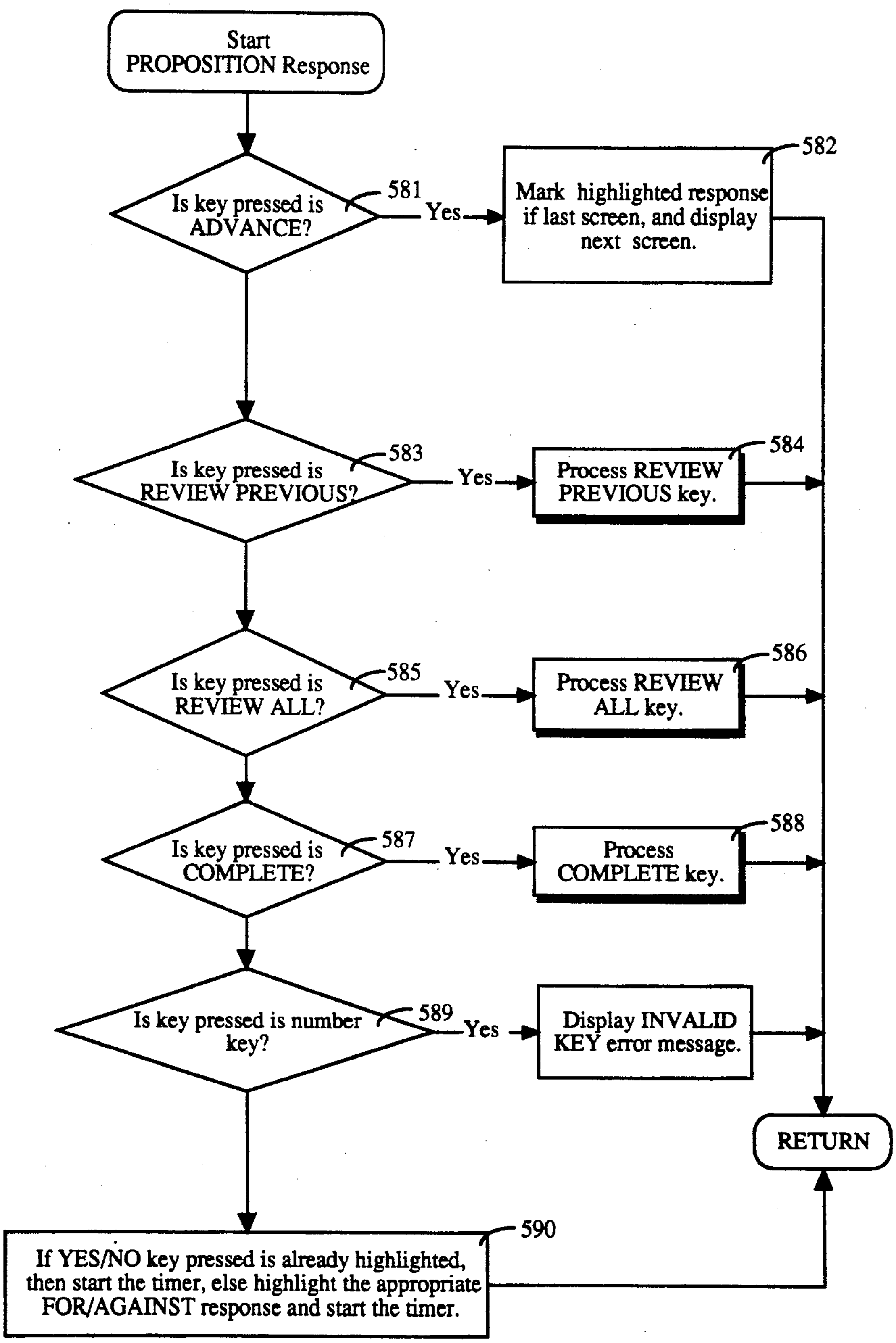
FIG. 5G is a flow chart of the Proposition Response process called by Proposition Voting.

FIG. 5G illustrates the Proposition Response process, which is similar to the Office Response process of FIG. 5E. Step 581 determines if the ADVANCE key 63*f* was pressed. If so, step 582 stores the response highlighted on display 62 in storage device 66 if the screen is the last screen for the current proposition, or displays the first screen of the next proposition, if there is one. The process then returns to the Proposition Voting process to determine if there are more screens for that proposition. Step 583 determines if the REVIEW PREVIOUS key 63*c* was pressed. If so, then step 584 calls a process that permits the voter to review the prior ballot display. Step 585 determines if the REVIEW ALL key 63*e* was pressed. If so, step 586 calls a process that permits the voter to review all previous ballot displays. Step 587 determines if the COMPLETE key 63*g* was pressed. If so, step 588 calls a Complete process, which is explained below in connection with FIG. 5H. Step 589 determines if the key pressed is one of the number keys 63*a*. If so, an invalid key message is displayed. Otherwise, step 590 highlights the YES or NO response, waits for five seconds, and then terminates the Proposition Response process. As stated above, each Proposition process cycle represents one proposition screen, and the Proposition process is repeated by the main logic flow of the Vote Entry process if there are more proposition to be voted upon by the voter.

Referring again to FIG. 5A, after the voter has viewed all ballots and propositions, the Vote Entry process displays a screen offering the voter an opportunity to review the selections. Steps 512 and 513 are similar to the analogous steps of the Voting Response and the Proposition Response processes. Step 511 occurs when the voter wishes to end the voting session for that voter.

Figure 5H:
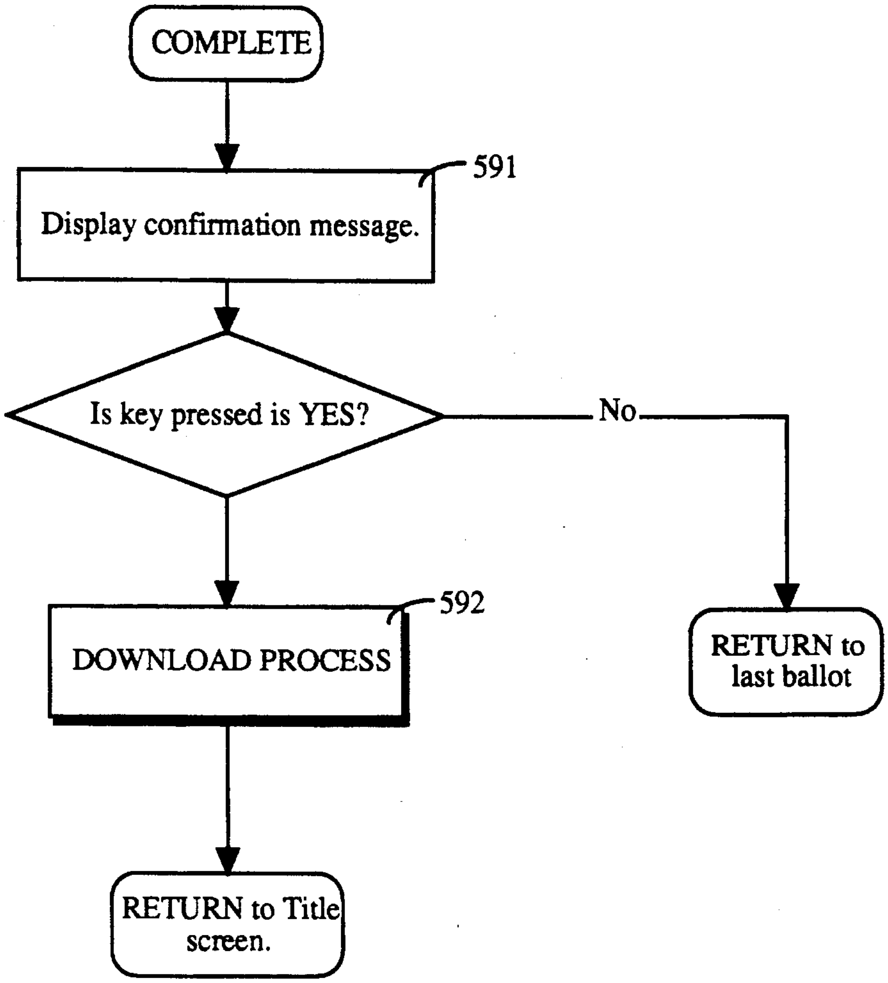
FIG. 5H is a flow chart of the Complete process called by Office Response and Proposition Response.

FIG. 5H illustrates the Complete process, which is called in response to the COMPLETE key 63*g* being pressed during the Office Response process or during the Proposition Response process. The Complete process begins with step 591, which displays a confirmation screen. The confirmation screen asks the voter to confirm that he or she is finished voting. The voter responds by pressing the YES key 63*b* or NO key 63*c* on keyboard 63. If the YES key 63*b* was pressed, step 592 calls a Download process, which is described in connection with FIG. 5I.

Figure 5I:
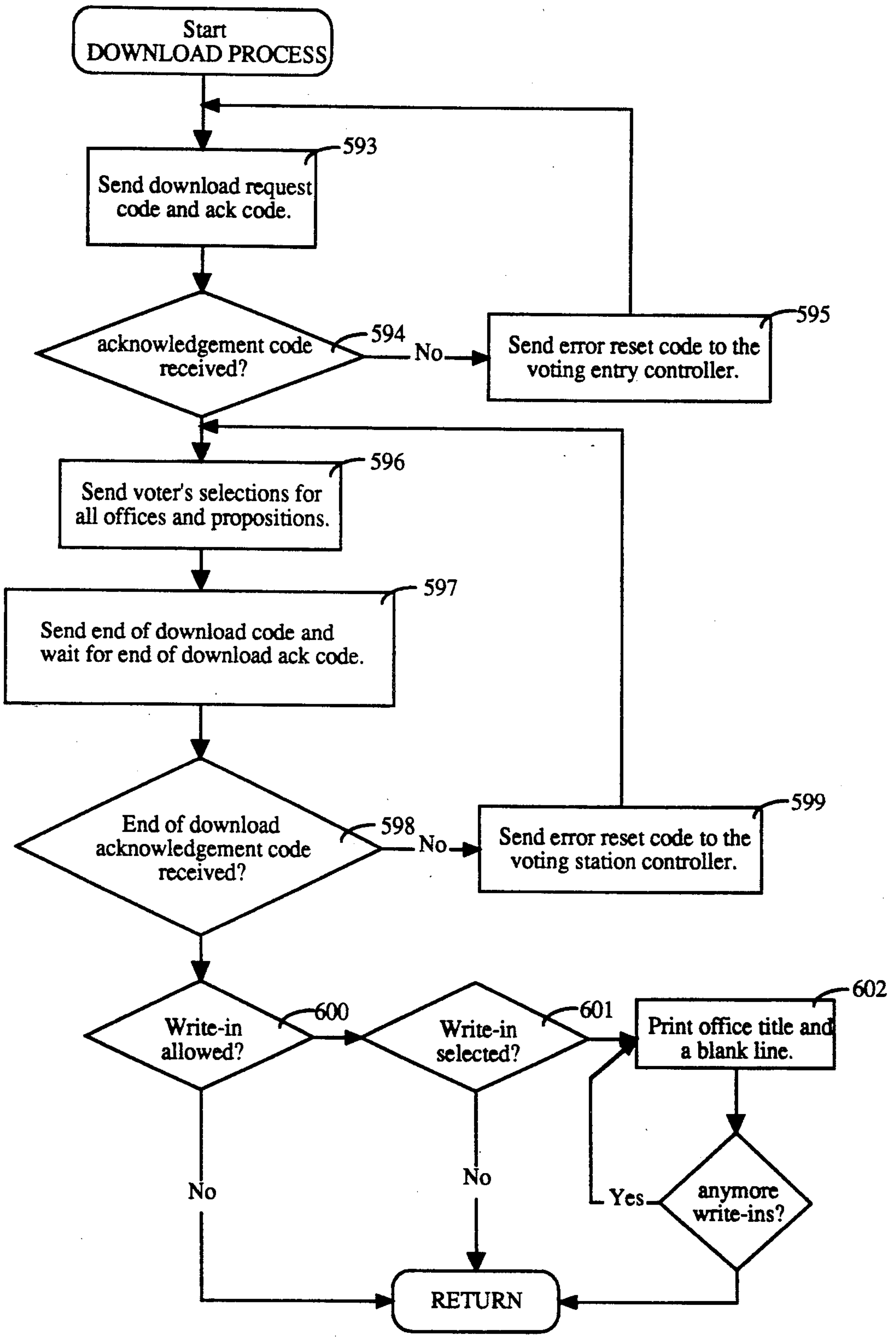
FIG. 5I is a flow chart of the Download process called by Complete.

Referring to FIG. 5I, the Download process begins with step 593, which sends a download request code to vote entry controller 11, and waits for an acknowledgement code to be returned. When an acknowledgement code is received, step 594 determines if the correct code was received from the vote entry controller 11. If the correct code was not received, step 595 sends an error code to vote entry controller 11 and re-executes step 571. If the correct acknowledgement code was received, step 596 sends the voter's selections for all offices and propositions to vote entry controller 11. Once the voter,s selections have been transmitted, step 597 sends a code to the vote entry controller 11 indicating that the download is complete and waits for an acknowledgement code. After the acknowledgement code is received, step 598 determines if the received code was proper. If the correct code was not received, step 599 sends an error code to vote entry controller 11 and re-executes step 598. If the correct code was received, step 600 determines if one or more vote entry stations 12 have been configured for write-in voting. If so, step 601 determines whether the voter has selected a write-in vote for any office during the Office Voting process. If so, step 602 prints an office title and a blank line for that office on printer 65. Step 602 is repeated for all offices for which write-in voting was selected. After the write-in ballots has been printed or if there are no write-ins, the Download process is completed and the processing returns to the Complete process of FIG. 5F. When the Download process is finished, the Complete process is also finished.

As stated above, FIGS. 6 and 7 illustrates sample ballot screens for the office voting a proposition voting ballots, respectively. As shown in FIG. 6, the office voting ballot includes a write-in option, which if entered, sets a variable used in the Complete process to generate a write-in ballot.

Although the invention has been described with reference to specific embodiments, this description is not meant to be construed in a limiting sense. Various modifications of the disclosed embodiments, as well as alternative embodiments will be apparent to persons skilled in the art. It is, therefore, contemplated that the appended claims will cover all modifications that fall within the true scope of the invention.

What is claimed is:

1. An automated voting system, comprising:

a number of vote entry stations, each having a computer programmed with a graphic interface for interactively displaying ballot screens and receiving votes from a voter only when activated with an activation code; and a vote entry controller in data communication with said vote entry stations, having a computer programmed to monitor the busy or idle status of said vote entry stations, to provide said activation code, and to receive downloaded votes from said vote entry stations, and having a data storage means for storing said downloaded votes.

2. The voting system of claim 1, wherein said computer of said vote entry controller is further programmed to operate as a voter registration station to verify a voter's registration and to certify the voter as eligible to vote by matching data associated with that voter with data in a database.

3. The voting system of claim 2, and further comprising means for connecting said voter registration with a central voter information station, such that they are in data communication.

4. The voting system of claim 1, wherein said vote entry stations are further programmed to maintain a separate copy of said votes after said votes are downloaded to said booth controller, wherein said copy may be used to generate a physically transportable copy on electromagnetic media.

5. The voting system of claim 1, wherein said vote entry stations are further programmed to maintain a separate copy of said votes after said votes are downloaded to said booth controller and to electronically communicate said votes to a remote location.

6. The voting system of claim 1, and further comprising means for connecting said vote entry station with a central vote collection database, such that they are in data communication.

7. The voting system of claim 1, wherein said vote entry stations have a printer in communication with said computer and wherein a computer of one of said vote entry stations is programmed to print write-in ballots on said printer.

8. The voting system of claim 1, wherein a computer of at least one of said vote entry stations is programmed to receive input from the voter to select a language in which said ballot will be displayed.

9. The voting system of claim 1, wherein a computer of at least one of said vote entry stations is programmed to permit a voter to vote a straight party by receiving input from the voter to select a particular party and designating all candidates in the selected party on said ballot screen.

10. The voting system of claim 1, wherein a computer of at least one of said vote entry stations is programmed to permit a voter to selectively review all ballot screens before said votes are made final.

11. The voting system of claim 1, wherein said computer of said vote entry controller is programmed to continually poll said vote entry stations to determine whether votes are ready for downloading.

12. The voting system of claim 1, wherein a computer of at least one of said vote entry stations is programmed so that downloading occurs only upon receipt of a correct downloading activation code.

13. The voting system of claim 1, wherein said vote entry station accept input from said voter via a keyboard having dedicated keys.

14. A method of using a computer network for automated voting, comprising the steps of:

interactively displaying ballot screens and receiving voting input from a voter, using computer-based vote entry stations, each in communication with a computer-based vote entry controller;

inactivating any of said vote entry stations when no authorized voter is voting at that station, using a computer code;

delivering an activation code via data communications link to any of said vote entry stations to permit a voter to vote at that station, using a computer code;

monitoring the busy or idle status of said vote entry stations, using a computer code to indicate said status; and downloading votes from said vote entry stations to the vote entry controller from any one of said vote entry stations when that vote entry station is determined to be idle.

15. The method of claim 14, and further comprising the step of storing said downloaded votes for subsequent collection.

16. The method of claim 14, and further comprising the step of storing said votes at said vote entry stations.

17. The method of claim 14, and further comprising the step of displaying said ballot screens in one of a number of languages, as determined by input from said voter.

18. The method of claim 14, and further comprising the step of receiving input from a voter at any one of said vote entry stations, wherein that vote entry station responds by permitting said voter to review said ballot screens after voting.

19. The method of claim 14, wherein said downloading step occurs only upon receipt of a correct downloading code at said vote entry station.

20. The method of claim 14, and further comprising the step of verifying the eligibility of said voter as a register voter, using an interactive computer program stored in a computer-based voter registration computer that may be part of said computer network, and is at the same site as said computer network.

21. The method of claim 20, and further comprising the step of certifying said voter as not having voted in a particular election, using said voter registration computer in communication with a database at the same site as said voter registration computer or at a database at the site, and the step of updating said database with information that the voter has voted.

22. The method of claim 14, and further comprising the step of generating a voter registration affidavit for said voter, using said voter registration computer.

23. The method of claim 14, and further comprising the step of generating write-in ballots at the option of the voter.

24. The method of claim 14, and further comprising the step of automatically advancing each one of a number of ballot screens after said ballot screen has been displayed a predetermined time period.

* * * * *